US012462508B1

(12) United States Patent
Deliz Centeno et al.

(10) Patent No.: US 12,462,508 B1
(45) Date of Patent: Nov. 4, 2025

(54) USER REPRESENTATION BASED ON AN ANCHORED RECORDING

(71) Applicant: Apple Inc., Cupertino, CA (US)

(72) Inventors: Luis R. Deliz Centeno, Fremont, CA (US); Alessandra E. McGinnis, San Francisco, CA (US); Connor A. Smith, San Mateo, CA (US); Jack R. Dashwood, San Francisco, CA (US); Kevin Lee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 217 days.

(21) Appl. No.: 18/103,583

(22) Filed: Jan. 31, 2023

Related U.S. Application Data

(60) Provisional application No. 63/305,810, filed on Feb. 2, 2022.

(51) Int. Cl.
*G06T 15/00* (2011.01)
*G06F 3/16* (2006.01)
(Continued)

(52) U.S. Cl.
CPC ............... *G06T 19/20* (2013.01); *G06F 3/16* (2013.01); *G06T 7/70* (2017.01); *G06T 13/40* (2013.01);
(Continued)

(58) Field of Classification Search
CPC ......... G06T 19/00; G06T 17/20; G06T 17/00; G06T 15/10; G06T 15/00; G06T 13/40; G06T 15/06; G06T 15/08; G06T 15/20; G06T 15/04; G06T 2210/41; G06T 15/005; G06T 1/20; G06T 19/006; G06T 7/337; G06T 7/50; G06T 7/74; G06T 19/20; G06T 2200/04; G06T 2207/10016; G06T 2207/30244; G06T 2219/024; G06T 2219/2016; G06T 2210/12; G06T 2210/21; G06T 7/70; G06T 2207/20084; G06F 16/51; G06F 21/602; H04N 23/64; H04N 23/90; H04N 23/611; H04N 23/635; G06V 20/20
(Continued)

(56) References Cited

U.S. PATENT DOCUMENTS 10,937,391 B2    3/2021   Griswold et al.
2017/0243403 A1  8/2017   Daniels et al.
(Continued)

*Primary Examiner* — Gordon G Liu
(74) *Attorney, Agent, or Firm* — Thompson Hine LLP

(57) ABSTRACT

Various implementations present a viewing session on an electronic device based on a view of an avatar (e.g., a representation of a content creator) that is based recorded positional data and the identification of an anchor in the viewing environment during the recording of content (e.g., a memory). For example, at a first device having a processor, a process may obtain recorded data (e.g., recorded user data) including recorded positional data of a user moving relative to a coordinate space of an anchor (a room or object) during a recording in a physical environment. Then the process may identify the anchor (e.g., the actual statue or the replica) in a viewing environment based on the recorded data. Then the process may present a view of a moving avatar corresponding to the user based on the recorded positional data and the identification of the anchor in the viewing environment.

25 Claims, 10 Drawing Sheets

(51) Int. Cl.
*G06T 7/70* (2017.01)
*G06T 13/40* (2011.01)
*G06T 19/20* (2011.01)
*G06V 10/74* (2022.01)
*G06V 40/16* (2022.01)

(52) U.S. Cl.
CPC .......... *G06V 10/761* (2022.01); *G06V 40/174* (2022.01); *G06T 2207/30201* (2013.01); *G06V 2201/07* (2022.01)

(58) Field of Classification Search
USPC ....................................................... 345/419
See application file for complete search history.

(56) References Cited

U.S. PATENT DOCUMENTS

| | | | |
|---|---|---|---|
| 2019/0114802 A1* | 4/2019 | Lazarow | H04W 56/001 |
| 2019/0378335 A1 | 12/2019 | Bentovim et al. | |
| 2020/0117270 A1* | 4/2020 | Gibson | G06F 3/011 |
| 2021/0349529 A1 | 11/2021 | Winold et al. | |
| 2021/0364790 A1* | 11/2021 | Gullicksen | G01S 11/026 |
| 2021/0373741 A1 | 12/2021 | Agarawala et al. | |
| 2022/0028108 A1* | 1/2022 | Haapoja | G06Q 30/0643 |
| 2023/0196697 A1* | 6/2023 | Fishman | G06F 3/011 |
| | | | 345/633 |

\* cited by examiner

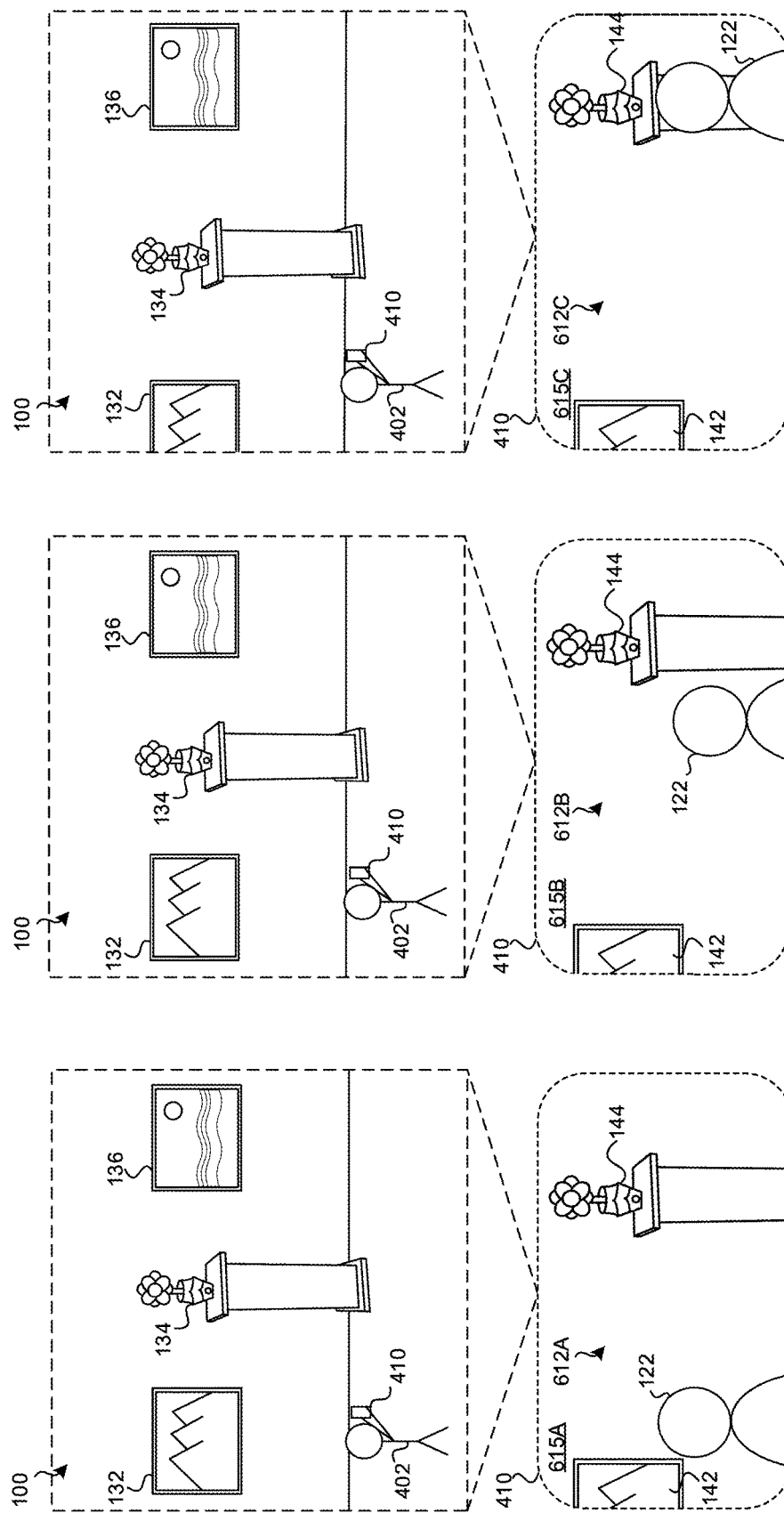

US 12,462,508 B1

USER REPRESENTATION BASED ON AN ANCHORED RECORDING

CROSS-REFERENCE TO RELATED APPLICATIONS

This application claims the benefit of U.S. Provisional Application Ser. No. 63/305,810 filed Feb. 2, 2022, which is incorporated herein in its entirety.

TECHNICAL FIELD

The present disclosure generally relates to electronic devices that use sensors to provide views during viewing sessions, including views that include a representation of a content creator anchored to an object.

BACKGROUND

Various techniques are used to represent a content creator as they record content (e.g., a video). For example, a viewer may see representations of one or more objects, such as realistic or unrealistic representations of the creator (e.g., avatars), while viewing the recorded content during a viewing session. For example, a content creator may be a docent making a video recording of him or herself speaking about an exhibit (e.g., a particular statue) in a museum. A viewer of the content during a viewing session may attempt to watch an avatar of the content creator, but this may be inconvenient or difficult, especially if the viewer wants to walk around the exhibit during the viewing.

SUMMARY

Various implementations disclosed herein include devices, systems, and methods that provide a representation of one or more objects within an extended reality (XR) experience during a viewing session. In an exemplary implementation, the representation of an object may include at least a portion of a representation of a content creator (e.g., an avatar). The XR experience presents recorded content (e.g., recorded video content, also referred to as a "memory"), such as a representation of content as recorded by the content creator, during a viewing session.

During an example viewing session (e.g., a viewer watching a memory recorded by a content creator), the positioning of the representation(s) (e.g., the representation of the content creator) is based on a viewer's position relative to a position of the content creator anchored to an area or object during the recording of the memory. The content may be recorded while tracking a position of a creator based on the anchor point (e.g., a particular statue in a museum), such that during playback, a viewer may view the memory as he or she is walking around the museum. For example, the avatar of the content creator continues to play where the content creator recorded the content, but the viewer is free to move around. The recorded data of the content creator may include user pose information in a coordinate space of an anchor area or object, face/lip movement data, spoken audio, and the like.

In another example, the avatar can be generated based on data separate from the recorded data and thus the viewer may be able to move behind the avatar's location and see a different view of the avatar (e.g., seeing the back of the avatar even if the back of the user wasn't recorded). The recorded user data can include recorded head/face/lip data and/or physiological data used to animate the avatar, by providing animated face/lip/hand/body movements and expressions synchronized with the spoken audio and recorded user emotions.

In another example, the recorded content is anchored to an anchor or replicas/instances of the anchor. For example, the user representation may be positioned/oriented relative to a replica of the statue, and providing playback based on the coordinates of that anchor location. An anchor can be moved to an anchor location such that the playback is viewed relative to that anchor location. For example, a user can watch a recording of a docent providing a description of a statue, where the viewer sees the avatar of the docent and a virtual replica of the statue at his or her current location (e.g., their home). Thus, the playback of the content (e.g., the avatar of the docent) is anchored to the virtual replica of the statue, and the viewer can move about his location watching the recorded content.

In general, one innovative aspect of the subject matter described in this specification can be embodied in methods, at a first device having a processor, that include the actions of obtaining recorded data including recorded positional data of a user moving relative to a coordinate space of an anchor during a recording in a physical environment, wherein the recorded positional data was obtained via one or more sensors on a second device during the recording, identifying, in a viewing environment based on the recorded data, a local anchor, and presenting a view of a moving avatar corresponding to the user, where the moving avatar is positioned based on the recorded positional data and the identification of the local anchor in the viewing environment.

These and other embodiments can each optionally include one or more of the following features.

In some aspects, the recorded positional data is based on estimated pose information of the user relative to the position of the anchor in the physical environment.

In some aspects, identifying the local anchor in the viewing environment includes identifying a pose of the local anchor in the viewing environment relative to the first device. In some aspects, identifying the local anchor in the viewing environment is based on a match process that matches features associated with the viewing environment with features associated with the physical environment.

In some aspects, the recorded data further includes image data associated with the user and wherein the avatar is presented based on the image data. In some aspects, the recorded data includes a visual representation of the anchor.

In some aspects, the visual representation of the anchor is used to identify the local anchor. In some aspects, presenting the view includes presenting the visual representation of the anchor.

In some aspects, in accordance with identifying the local anchor in the viewing environment, forgo presenting the visual representation of the anchor. In some aspects, identifying the local anchor in the viewing environment includes receiving a selection of a physical object in the viewing environment, wherein the selected physical object is identified as the local anchor. In some aspects, identifying the local anchor in the viewing environment includes a request to present a visual representation of the anchor, wherein the visual representation of the anchor is identified as the local anchor.

In some aspects, the avatar is presented based on a separately recorded three-dimensional (3D) model of the user.

In some aspects, presenting the view of the moving avatar includes determining a distance between a position of the first device and the local anchor in the viewing environment, and presenting the view of the moving avatar when the determined distance is within a threshold. In some aspects, presenting the view of the moving avatar is further based on user input. In some aspects, presenting the view of the moving avatar includes presenting additional content associated with a different anchor.

In some aspects, presenting the view of the moving avatar includes displaying a guiding indicator to guide a viewer to move the first device to a new position associated with the local anchor. In some aspects, the guiding indicator includes a spatialized audio element that guides the viewer to the new position relative to the local anchor.

In some aspects, presenting the view of the moving avatar includes presenting the avatar in a first presentation mode, and the method further includes, in accordance with a determination to switch the first presentation mode to a second presentation mode, presenting the avatar in the second presentation mode.

In some aspects, the recorded data includes audio associated with the user moving relative to the coordinate space of the anchor, and wherein presenting the view of the moving avatar includes playback of the audio associated with the user moving relative to the coordinate space of the anchor.

In some aspects, the avatar includes a virtual avatar that guides a viewer to move the first device to a new position in accordance with the recorded positional data of the user moving relative to the coordinate space of the anchor. In some aspects, the avatar is based on physiological data of the user obtained via the one or more sensors.

In some aspects, at least a portion of the recorded data includes facial movements of the user as the second device is moved within the physical environment, and wherein the avatar mimics the facial movements during the presenting the view of the moving avatar.

In some aspects, the recorded positional data includes a pose of a viewing direction of the second device. In some aspects, the recorded positional data includes spatially-based bookmarks associated with the physical environment. In some aspects, the recorded positional data includes playback criteria associated with the physical environment and presenting the view of the moving avatar is based on the playback criteria.

In some aspects, the view is presented based on recorded data from the first device and recorded data from a plurality of other devices. In some aspects, obtaining the recorded data includes obtaining spatial data of a scene in the physical environment.

In some aspects, the view includes an image, video, or 3D reconstruction of the physical environment obtained via the one or more sensors on the second device during the recording. In some aspects, presenting the view of the moving avatar includes presenting the moving avatar in an extended reality (XR) environment. In some aspects, the first device or the second device is a head-mounted device (HMD).

In general, one innovative aspect of the subject matter described in this specification can be embodied in methods, at a first device having a processor and one or more sensors, that include the actions of receiving a selection of an anchor corresponding to an anchor location in a physical environment, acquiring content in the physical environment including a person, the content based on sensor data of the physical environment captured via the one or more sensors, determining estimated pose information of the person relative to a coordinate space of the anchor during the acquiring of the content, wherein the estimated pose information was obtained via the one or more sensors while acquiring the content, and storing the content for playback at a second device based on the anchor location, the sensor data, and the estimated pose information.

These and other embodiments can each optionally include one or more of the following features.

In some aspects, the selection of the anchor is based on user input. In some aspects, the selection of the anchor is based on an audio cue. In some aspects, the selection of the anchor is based on content of audio of the person associated with a physical object in the physical environment. In some aspects, the selection of the anchor is based on object detection.

In some aspects, determining the estimated pose information includes determining recorded positional data including positions of the first device associated with movements of the person as the first device is moved within the physical environment. In some aspects, the recorded positional data includes spatially-based bookmarks associated with the physical environment.

In some aspects, the content includes audio associated with the person moving relative to the coordinate space of the anchor. In some aspects, the content further includes image data associated with the person.

In some aspects, the content includes a visual representation of the anchor. In some aspects, storing the content for playback includes providing a representation of the person in place of a view of the person. In some aspects, the representation of the person is based on physiological data of the person obtained via the one or more sensors. In some aspects, at least a portion of the person includes facial movements as the first device is moved within the physical environment during the acquiring of the content, and the representation of the person mimics the facial movements.

In some aspects, acquiring the content includes obtaining spatial data of a scene in the physical environment. In some aspects, storing content for playback includes providing a guiding indicator to guide a viewer to move the second device to a new position relative to the anchor. In some aspects, the guiding indicator includes a spatialized audio element that guides the viewer to the new position.

In some aspects, the estimated pose information includes a pose of a viewing direction of the first device.

In some aspects, the playback of the content is presented in an extended reality (XR) environment. In some aspects, the first device or the second device is a head-mounted device (HMD).

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 6A-6C illustrate exemplary views of an electronic device during a viewing session by a viewer of a user representation based on an anchored recording, in accordance with some implementations.

Figure 1C:
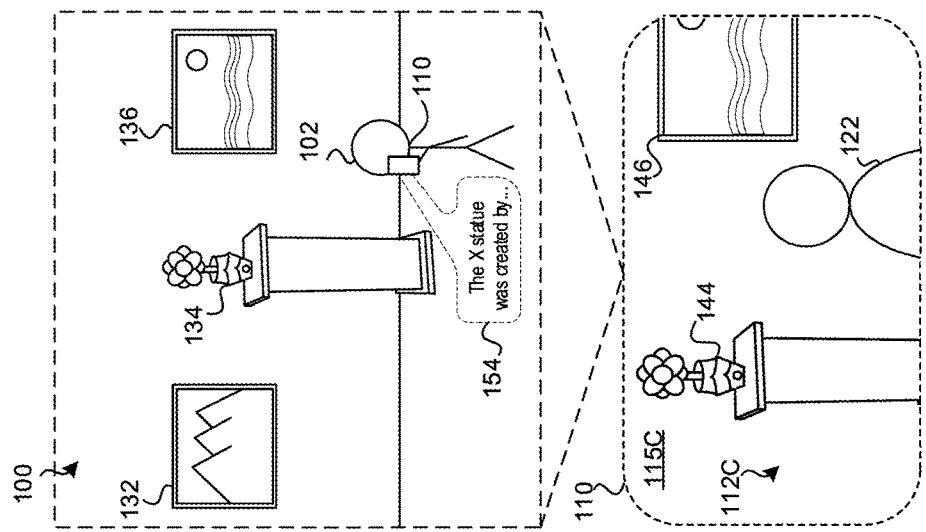
FIGS. 1A-1C illustrate exemplary views of an electronic device recording content and positional data of a content creator moving relative to a coordinate space of an anchor, in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Figure 1B:
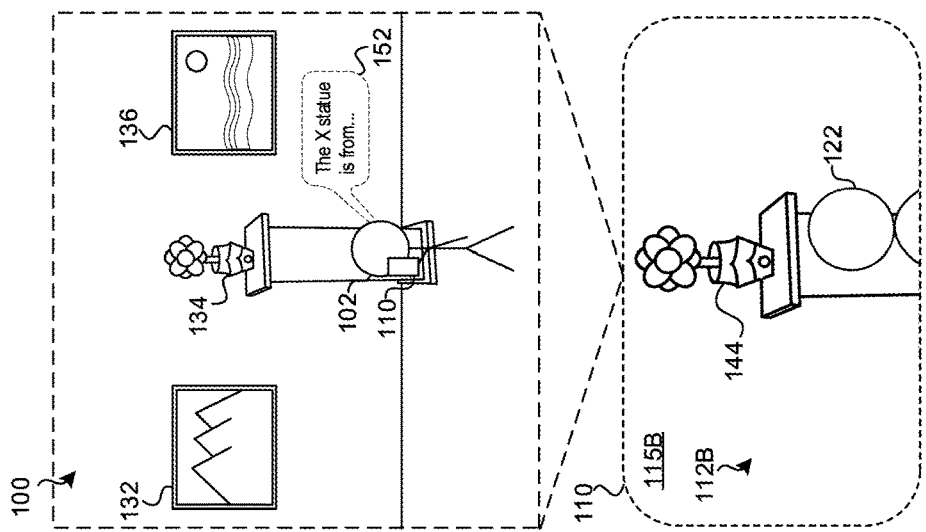
Figure 1A:
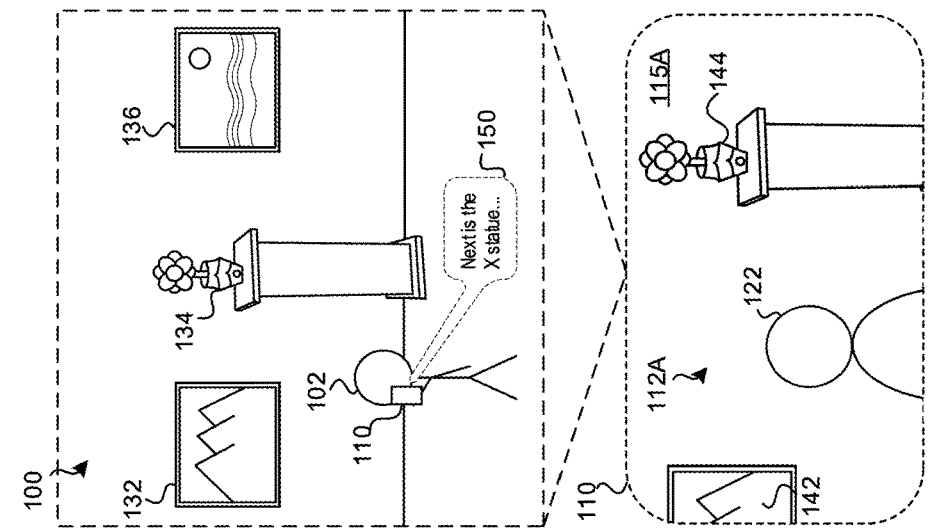

FIGS. 1A-1C illustrate exemplary views of an electronic device recording content and positional data of a content creator moving relative to a coordinate space of an anchor, where each view is a representation of the content recorded by the electronic device in accordance with some implementations. For instance, FIGS. 1A-1C illustrate an exemplary electronic device 110 providing view 115A of 3D environment 112A, view 115B of 3D environment 112B, and view 115C of 3D environment 112C, respectively, operating in a physical environment 100 during a recording of content. For example, FIGS. 1A-1C may represent a recording at three different periods of time while the user 102 records content of the physical environment 100. In these examples of FIGS. 1A-1C, the physical environment 100 is a room (e.g., a particular room or exhibit of a museum) that includes a first wall hanging 132, a statue 134, and a second wall hanging 136. In particular, FIG. 1A of physical environment 100, for a first period of time, illustrates user 102 (e.g., a content creator, such as a docent recoding a video in a museum) standing in front of and providing a narration 150 about the statue 134 (e.g., "Next is the X statue . . . "). FIG. 1B of physical environment 100, for a second period of time, illustrates user 102 standing in front of and providing a narration 152 about the statue 134 (e.g., "The X statue is from . . . "). FIG. 1C of physical environment 100, for a third period of time, illustrates user 102 standing in front of and providing a narration 154 about the statue 134 (e.g., "The X statue was created by . . . ").

The electronic device 110 includes one or more cameras, microphones, depth sensors, or other sensors that can be used to capture information about and evaluate the physical environment 100 and the objects within it (e.g., statue 134 as the anchor object, also referred to herein as a local anchor), as well as information about the user 102 of the electronic device 110 (e.g., positional data of the user 102). The information about the physical environment 100 and/or user 102 may be used to provide visual and audio content during the viewing session. For example, a viewing session may provide views (e.g., views 115A, 115B, and 115C) of a 3D environment (e.g., 3D environment 112A, 112B, and 112C) that is generated based on camera images and/or depth camera images of the physical environment 100 and, optionally, a representation 122 of user 102 based on camera images and/or depth camera images of the user 102 (e.g., while the user 102 records a video of himself or herself centered around an anchor object-statue 134). In other examples, a representation 122 of user 102 may be based on camera images and/or depth camera images from a different set of cameras than used to record the 3D environment. For example, a set of forward-facing cameras on an HMD may be used to capture 2D or 3D video of physical environment 100, while a second set of cameras may be used to track the user's 102 facial expressions, body pose, or the like. In some implementations, the electronic device 110 records and shares information with another device (e.g., a viewer device), or an intermediary device such as a viewing session server.

In some implementations, the recorded positional data of the user 102 includes a pose of a viewing direction of the device 110. For example, a viewer can view the same pose and viewing direction as intended by the user 102 that created the content (e.g., a docent recording a tour using device 110). In some implementations, determining recorded positional data includes determining estimated pose information of the user 102 relative to the position of the user 102 in the physical environment 100. For example, the device 110 can capture skeletal pose information/estimation of the user 102 relative to the physical environment to know what the tour guide has done relative to the physical environment 100 (e.g., the museum) and an anchor object (e.g., statue 134).

In the example illustrated in FIG. 1A, the electronic device 110 provides a view 115A that includes a representation 142 of the first wall hanging 132, a representation 144 of the statue 134, and a representation 122 (e.g., a generated avatar, an image, a video, etc.) of at least a portion of the user 102 (e.g., from mid-torso up) within a 3D environment 112A. Similarly, in the example illustrated in FIG. 1B, the electronic device 110 provides a view 115B that includes a representation 144 of the statue 134 and the representation 122 of at least a portion of the user 102 within a 3D environment 112B, and in the example illustrated in FIG. 1C, the electronic device 110 provides a view 115C that includes a representation 146 of the second wall hanging 136, a representation 144 of the statue 134, and a representation 122 of at least a portion of the user 102 within a 3D environment 112C. In some implementations, as the user 102 moves around, makes hand gestures, and makes facial expressions, corresponding movements, gestures, and expressions may be displayed for the representation 122 in each view 115. In other implementations, the views 115 of the 3D environment may not include a representation 122 of the user 102. For example, this may occur when user 102 records a video of physical environment 100 without recording video of him/herself or records a video of physical environment 100 using forward-facing cameras of an HMD and records their facial expressions, body pose, or the like using another set of cameras or camera images that are not used to generate views 115.

While the example of FIGS. 1A-1C shows a user 102 recording content within a physical environment 100, it should be appreciated that content may be recorded within other types of 3D environments. For example, a recording session may involve user 102 or a representation 122 of user 102 positioned within an entirely virtual environment or an extended reality (XR) environment that includes some physical environment representations and some virtual environment representations. In some implementations, the physical environment of a recording session may be generated using 3D content creation tools and may not be based solely on camera images and/or depth camera images of a physical environment. For example, user 102 may provide and record a tour of a completely virtual environment including a typical street from New York City in the 1800s. In this example, the virtual street may have been created using a 3D content creation tool and the recorded content may only include views of this virtual street or may optionally include information obtained from cameras, microphones, depth sensors, or other sensors to, e.g., provide a visual and audible representation of user 102 as they recorded the content. In another example, user 102 may provide and record a tour of a physical museum, but may include a virtual object, such as a virtual map or information card, near a physical painting to aid in the understanding of what is being viewed. In this example, the recorded content may include images, video, or a 3D reconstruction of the physical museum, physical painting, and user 102 obtained from one or more cameras, depth sensors, or the like, as well as the virtual content (e.g., virtual map or information card) positioned relative to the physical environment. The viewing session environment is further described herein with reference to FIGS. 4A-4C, 6A-6C, and 7A-7C.

In some implementations, each 3D environment 112 is an XR environment that is based on a coordinate system that can be shared with other users (e.g., a virtual room for avatars for a multi-person viewing session). In other words, the coordinate system of the 3D environment 112 is different than the coordinate system of the physical environment 100 for user 102 (e.g., a generated avatar of content creator may be viewed differently with respect to another object).

In some implementations, the representation 122 of user 102 (e.g., the content creator, such as a docent) may be realistic or unrealistic and/or may represent a current and/or prior appearance of the user 102. For example, a photorealistic representation of the user 102 may be generated based on a combination of live images and prior images of the user. The prior images may be used to generate portions of the representation 122 for which live image data is not available (e.g., portions of a user's face that are not in view of a camera or sensor of the electronic device 110 or that may be obscured, for example, by a headset or otherwise). In one example, the electronic device 110 is a head mounted device (HMD) and live image data of the user's face includes a downward facing camera images of the user's checks and mouth and inward facing camera images of the user's eyes, which may be combined with prior image data of the user's other portions of the users face, head, and torso that cannot be currently observed from the sensors of the device 110. Prior data regarding a user's appearance may be obtained at an earlier time during the viewing session, during a prior use of the electronic device, during an enrollment process used to obtain sensor data of the user's appearance from multiple perspectives and/or conditions, or otherwise.

Some implementations provide authored content that includes a representation of at least a portion of a user within a 3D environment and, based on detecting a condition, may also include a representation of another object of the user's physical environment to provide context. For example, during the recording of content for a viewing session illustrated in FIGS. 1A-1C, representations of one or more other objects of the physical environment 100 may be displayed in each view 115. For example, based on determining that the user 102 is interacting with a physical object in physical environment 100, a representation (e.g., realistic or proxy) may be displayed in each view 115 to provide context for the interaction of the user 102 (e.g., a docent referring to particular painting or statue in a museum as he or she walks through an exhibit or a particular room in the museum). Additionally, based on determining that the user 102 is interacting with (or speaking about) a particular physical object in physical environment 100 (e.g., statue 134), processes described herein can associate that particular physical object as an anchor object (e.g., local anchor) for at least a portion of the recorded user data. For example, as the user 102 is describing and walking around statue 134, the system can associate the statue 134 as an anchor such that a generated avatar would be positioned based on the location of the anchor object (or a replica of the anchor object) during a viewing session for that portion of the recording.

In use, FIGS. 1A-1C illustrate authoring guided content by embedding a creator's movement, gestures, and speech into a scene. For example, for a docent to record a museum tour, the creator can record their body pose, voice, facial expression, or other data (e.g., location information) relative to the environment around them. This data can later be reconstructed such that a digital copy (e.g., a digital docent) can be summoned at any time to re-play the recorded tour, without the original docent needing to be present. Thus, when the digital tour is replayed, only a digital component of the docent (e.g., an avatar) is provided to the viewer to give the tour. In other words, in order for a creator (e.g., a docent) to create a digital tour, he or she only needs to hit a "record" button, perform the tour once, and their performance is captured permanently relative to the scene. In the examples illustrated herein, the docent is recording focused content about statue 134 (e.g., the anchor object of the anchored recording). Thus, as the user 102 walks around and talks about statue 134, a representation 122 of the user 102 may be generated for a viewer to replay the recording and watch an avatar of the docent talk about the statue 134.

In some implementations, positional data is recorded that identifies 6 degrees of freedom (6 DoF) positional information of the user 102 within the physical environment 100. For example, the 6 DoF positional information may be utilized to record where the user 102 is standing, which direction the user 102 is facing, etc. In one example, the user 102 (e.g., the creator) may be a docent recording a tour in a museum while holding a device that records images of the user 102 giving the tour as well as positional data about user 102 as the he or she gives the tour, which is being recorded. The recorded content and positional data may be associated with one another for later use generating 3D content such as a playback view (e.g., 2D or 3D) of the user 102 giving the tour. The use of the recorded content (e.g., images, depth, etc.) and positional data may enable a playback view at the same location and/or orientation within the same physical environment 100. The positional data may define rooms, space-based bookmarks, space-based playback criteria. The recorded positional data was obtained via one or more sensors on the device 110 during the recording.

In some implementations, the representation 122 of the user 102 (e.g., an avatar) recording content on device 110 (e.g., a docent recording a museum tour) is based on physiological data of the user 102 obtained via the one or more sensors. For example, device 110 may include physiological sensors (e.g., heart rate, eye gaze, etc.) that can detect the user 102 (e.g., the docent recording a museum tour) is happy and therefore the generated avatar (e.g., the representation 122 of user 102) can mimic a person as smiling/happy. In some implementations, at least a portion of the user 102 includes facial movements as the device 110 is moved within the physical environment during the acquiring of the content, and the representation 122 of the user 102 mimics the facial movements. For example, camera sensors can detect the user 102 (e.g., the docent recording a museum tour) is smiling and therefore the generated avatar (e.g., the representation 122 of user 102) can mimic the smile.

Figure 2:
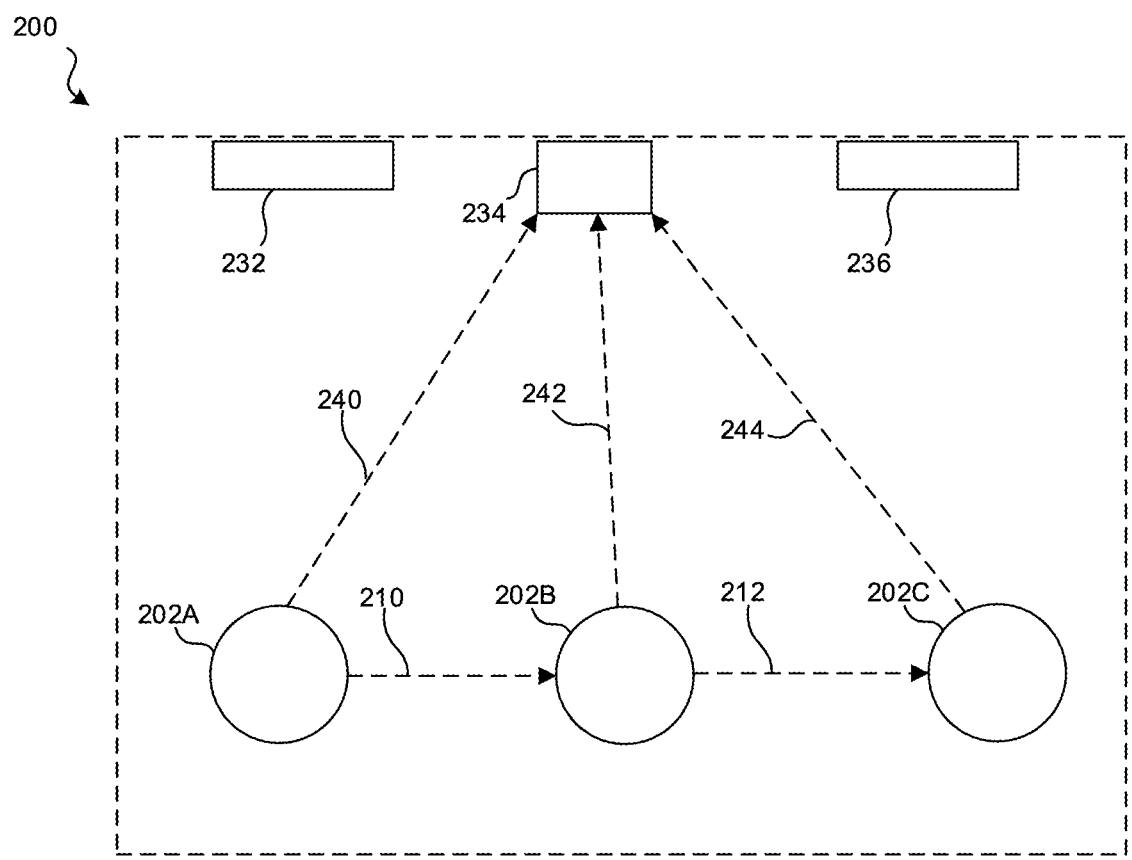
FIG. 2 illustrates an example location map based on the movement of the content creator of FIGS. 1A-1C in accordance with some implementations.

FIG. 2 illustrates an example location map 200 based on the movement of the content creator (e.g., user 102) of FIGS. 1A-1C (e.g., segment 210 and segment 212) in accordance with some implementations. The location map 200 illustrates a two-dimensional (2D) top-down view of locations of representations of users or other representations of objects within a 3D environment. In this example, during an example of recording content for a viewing session (e.g., the recorded content of FIGS. 1A-1C within the 3D environment 112A-112C, respectively), a recording or viewing session instruction set executed on an electronic device (e.g., device 110), or networked through an external server, can generate a location map 200 based on the representations of the user 102, and objects (e.g., first wall hanging 132, statue 134, and second wall hanging 136). For example, location indicator 232 depicts a location for representation 142 of first wall hanging 132, location indicator 234 depicts a location for representation 144 of statue 134, and location indicator 236 depicts a location for representation 146 of second wall hanging 136 for the recorded content illustrated in FIGS. 1A-1C. The location map 200 further illustrates the respective placement for the user representation 202A as the user 102 moves during each respective time period. For example, as the user 102 moves to the second location illustrated in FIG. 1B (e.g., in front of the statue 134), the location map 200 illustrates segment 210 of the movement of the user 102 to the location at representation 202B, and as the user 102 moves to the third location illustrated in FIG. 1C (e.g., in front of the second wall hanging 136), the location map 200 illustrates segment 212 of the movement of the user 102 to the location at representation 202C.

In an exemplary implementation, as the user 102 moves locations (e.g., walks around talking about statue 134, the anchor object), the system records user data such as positional information of the user 102 and/or device 110 in a coordinate space of the anchor area/object and tracks that information in the location map 200. For example, when the user 102 is at the location at representation 202A, anchor object positional information 240 (e.g., the location data of the user 102 or device 110 with respect to the coordinate space of the anchor object-statue 134) is acquired. Similarly, as the user moves during the recording, additional anchor position information is acquired, such as anchor object positional information 242 at the location at representation 202B and anchor object positional information 244 at the location at representation 202C. A viewing session can then view a moving avatar that is positioned relative to a recognized anchor in the viewing environment based on the anchor object positional information 240, 242, and 244.

Figure 3:
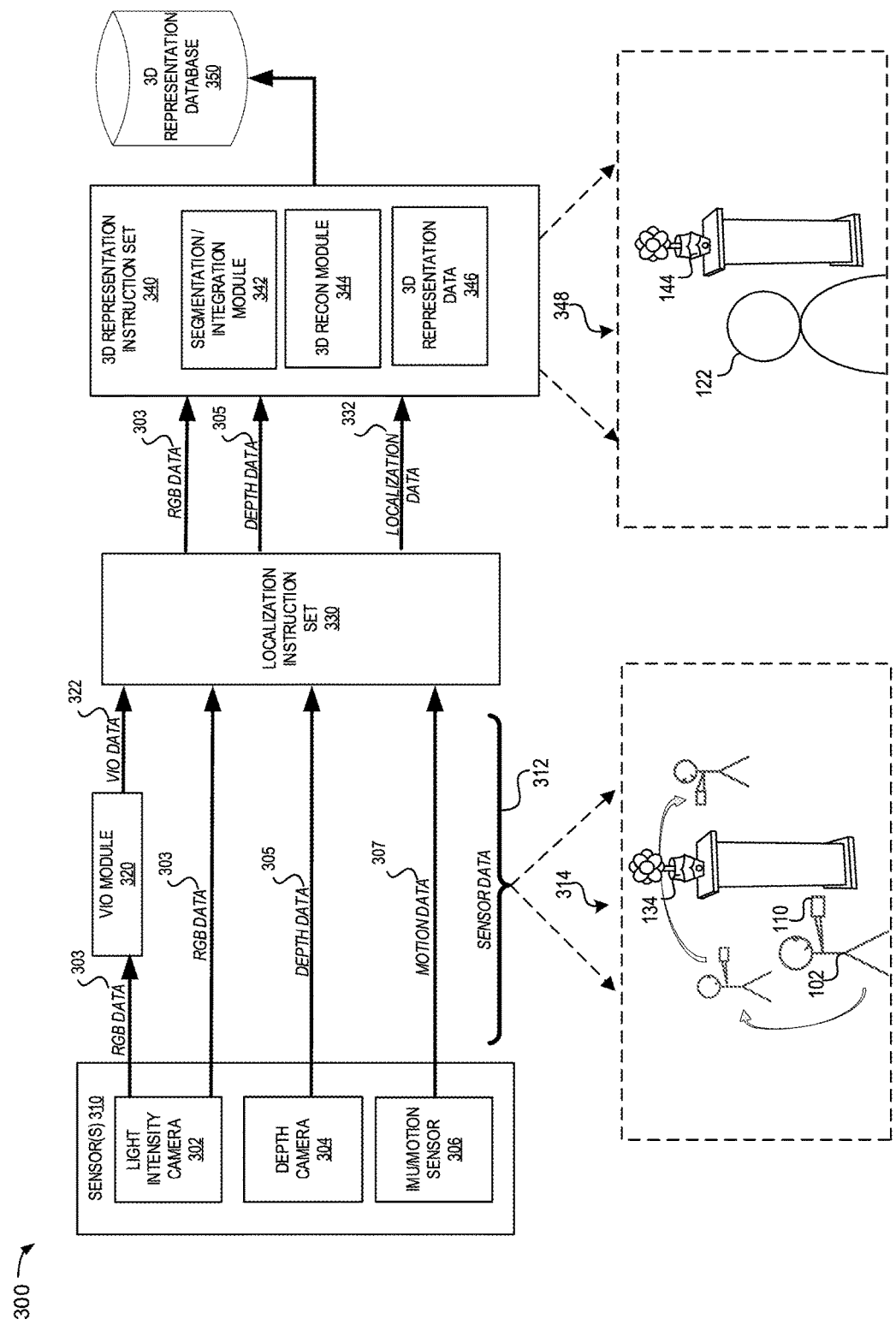
FIG. 3 is a system flow diagram of an example generation of three-dimensional (3D) representation data based on an anchored recording according to some implementations.

FIG. 3 is a system flow diagram of an of an example environment 300 for generating three-dimensional (3D) representation data of one or more objects of a physical environment based on localization of a device that is based on depth data and using the one or more objects for an anchored recording in accordance with some implementations. In some implementations, the system flow of the example environment 300 is performed on a device (e.g., device 110 of FIG. 1), such as a mobile device, desktop, laptop, or server device. In some implementations, the system flow of the example environment 300 is performed on processing logic, including hardware, firmware, software, or a combination thereof. In some implementations, the system flow of the example environment 300 is performed on a processor executing code stored in a non-transitory computer-readable medium (e.g., a memory).

The system flow of the example environment 300 acquires, utilizing a plurality of sensor(s) 310, light intensity image data 303 (e.g., live camera feed such as RGB from light intensity camera 302), depth image data 305 (e.g., depth image data such as RGB-D from depth camera 304), motion data 307 (e.g., motion trajectory data from motion sensor(s) 306) of a physical environment (e.g., the physical environment 105 of FIG. 1), acquires positioning information (e.g., VIO module 320 determines VIO data based on the light intensity image data 303), assesses the depth data 305 and motion data 307 to determine localization data 332 of the device (e.g., the localization instruction set 330), and generates 3D representation data 346 from the acquired sensor data (e.g., light intensity image data, depth data, and the like) and from the localization data 332 (e.g., the 3D representation instruction set 340). In some implementations, other sources of physical environment information can be acquired (e.g., camera positioning information such as position and orientation data from position sensors) as opposed to using a VIO system (e.g., VIO module 320).

In an example implementation, the environment 300 includes an image composition pipeline that acquires or obtains data (e.g., image data from image source(s), motion data, etc.) for the physical environment. Example environment 300 is an example of acquiring image sensor data (e.g., light intensity data, depth data, and motion data) for a plurality of image frames. For example, as illustrated in example environment 314, a user is walking around a room (e.g., a museum, such as environment 100 of FIG. 1)

acquiring sensor data from sensor(s) 310 that is focused on statue 134 (e.g., a docent recording a video focused on the statue 134). The image source(s) may include a light intensity camera 302 (e.g., RGB camera) that acquires light intensity image data 303 (e.g., a sequence of RGB image frames), a depth camera 304 that acquires depth data 305, and a motion sensor 306 that acquires motion data 307.

For positioning information, some implementations include a VIO system (e.g., VIO module 320) to determine equivalent odometry information (e.g., VIO data 322) using sequential camera images (e.g., light intensity image data 303) and motion data (e.g., motion data 307 acquired from the IMU/motion sensor 306 to estimate the distance traveled. Alternatively, some implementations of the present disclosure may include a simultaneous localization and mapping (SLAM) system (e.g., position sensors within the sensors 310). The SLAM system may include a multidimensional (e.g., 3D) laser scanning and range-measuring system that is GPS independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location.

In an example implementation, the environment 300 further includes a localization instruction set 330 that is configured with instructions executable by a processor to obtain sensor data (e.g., RGB data 303, depth data 305, etc.) and track a location of a moving device (e.g., device 110) in a 3D coordinate system using one or more techniques. For example, the localization instruction set 330 analyzes RGB images from a light intensity camera 302 with a sparse depth map from a depth camera 304 (e.g., time-of-flight sensor), plane extraction data (e.g., plane estimation parameters), and other sources of physical environment information (e.g., camera positioning information such as VIO data 322 from the VIO module 320, or a camera's SLAM system, or the like) to generate localization data 332 by tracking device location information for 3D reconstruction (e.g., a 3D model representing one or more objects of the physical environment of FIG. 1).

In an example implementation, the environment 300 includes a 3D representation instruction set 340 that is configured with instructions executable by a processor to obtain the sensor data (e.g., RGB data 303, depth data 305, etc.) and localization data 332 from the localization instruction set 330 and generate 3D representation data 346 using one or more techniques. For example, the 3D representation instruction set 340 analyzes RGB images from a light intensity camera 302 with a sparse depth map from a depth camera 304 (e.g., time-of-flight sensor, passive or active stereo sensors such as a structured light depth camera, and the like), and other sources of physical environment information (e.g., camera positioning information such as VIO data 322 from the VIO module 320, or a camera's SLAM system, or the like) to generate 3D representation data 346. For example, as illustrated in example environment 348, 3D representation data 346 may include the representation 122 of the user 102 (e.g., an avatar) and a representation 144 of the statue 134. The representation 144 may be an image of the statue 134, or the representation 144 may be a virtual replica of the statue 134.

In some implementations, the 3D representation data 346 may be stored in the 3D representation database 350. In some implementations, the 3D representation data 346 may be stored in the 3D representation database 350. For example, the location data, pose, and the like, of the user 102 may be stored by the system, and 3D representation data 346 may include accessing previously generated representation data (e.g., a previously stored avatar) from the 3D representation database 350. Thus, the system could then allow a viewer to walk around and view a moving avatar from different viewpoints (e.g., seeing the back of the avatar even if the back of the user wasn't recorded).

The 3D representation data 346 could be 3D representations representing the surfaces in a 3D environment using a 3D point cloud with associated semantic labels. In some implementations, the 3D representation data 346 may be stored as a volumetric representation and/or an occupancy map. In some implementations, the 3D representation data 346 is a 3D reconstruction mesh that is generated using a meshing algorithm based on depth information detected in the physical environment that is integrated (e.g., fused) to recreate the physical environment. A meshing algorithm (e.g., a dual marching cubes meshing algorithm, a Poisson meshing algorithm, a tetrahedral meshing algorithm, or the like) can be used to generate a mesh representing a room (e.g., physical environment 105) and/or object(s) within a room (e.g., first wall hanging 132, statue 134, second wall hanging 136, etc.). In some implementations, for 3D reconstructions using a mesh, a voxel hashing approach may be used in which 3D space is divided into voxel blocks, referenced by a hash table using their 3D positions as keys.

In some implementations, the 3D representation instruction set 340 includes an integration instruction set (e.g., integration/segmentation module 342) that is configured with instructions executable by a processor to obtain the subset of image data (e.g., light intensity data 303, depth data 305, etc.) and positioning information (e.g., camera pose information from the VIO module 320) and integrate (e.g., fuse) the subset of image data using one or more known techniques. For example, the image integration instruction set receives a subset of depth image data 305 (e.g., sparse depth data) and a subset of intensity image data 303 (e.g., RGB) from the image sources (e.g., light intensity camera 302 and depth camera 304), and integrates the subset of image data and generates 3D data. The 3D data can include a dense 3D point cloud (e.g., imperfect depth maps and camera poses for a plurality of image frames around the object) that is sent to the 3D representation instruction set 340. The 3D data can also be voxelized.

In some implementations, the 3D representation instruction set 340 includes a semantic segmentation instruction set (e.g., integration/segmentation module 342) that is configured with instructions executable by a processor to obtain a subset the light intensity image data (e.g., light intensity data 303) and identify and segment wall structures (wall, doors, windows, etc.) and objects (e.g., person, table, teapot, chair, vase, etc.) using one or more known techniques. For example, the segmentation instruction set receives a subset of intensity image data 303 from the image sources (e.g., light intensity camera 302), and generates segmentation data (e.g., semantic segmentation data such as RGB-S data). In some implementations, a segmentation instruction set uses a machine learning model, where a semantic segmentation model may be configured to identify semantic labels for pixels or voxels of image data. In some implementations, the machine learning model is a neural network (e.g., an artificial neural network), decision tree, support vector machine, Bayesian network, or the like.

Figure 4C:
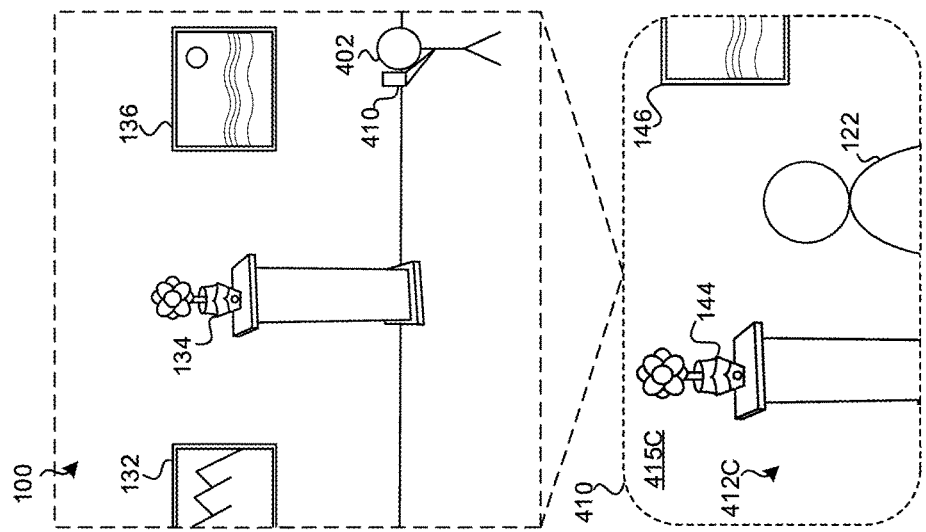
FIGS. 4A-4C illustrate exemplary views of an electronic device during a viewing session by a viewer of a user representation based on an anchored recording, in accordance with some implementations.
Figure 4B:
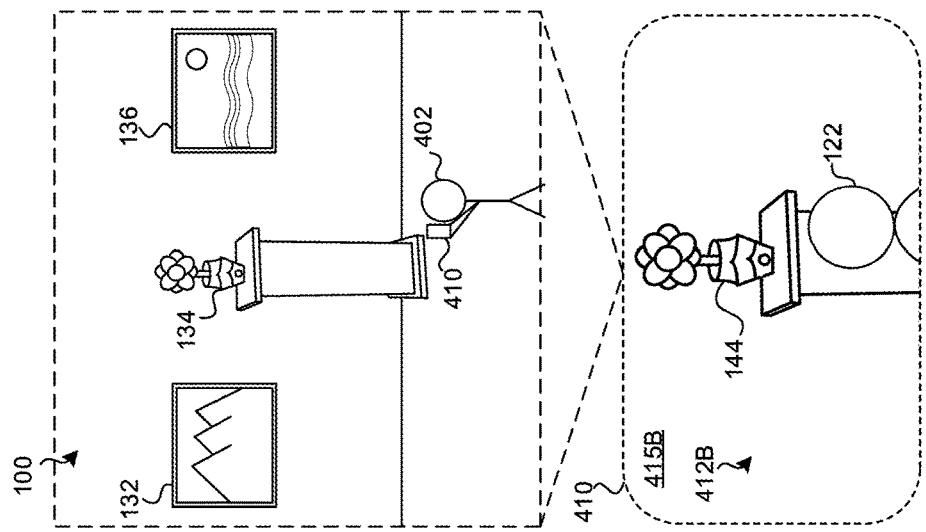
Figure 4A:
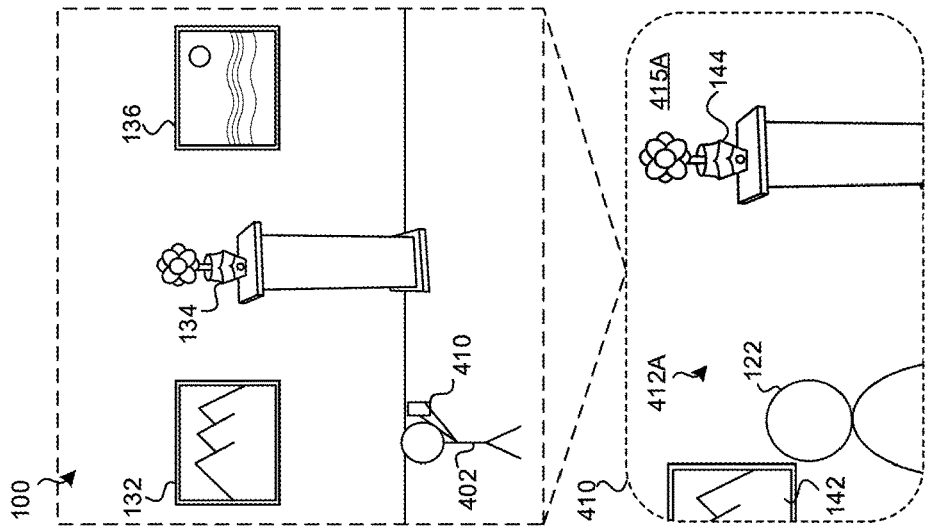

FIGS. 4A-4C illustrate exemplary views of an electronic device during a viewing session by a viewer of a user representation based on an anchored recording, where each view is of an extended reality (XR) environment that includes a representation of the content creator of FIGS. 1A-1C, and a portion of the physical environment, in accordance with some implementations. For instance, FIGS. 4A-4C illustrate an exemplary electronic device 410 providing view 415A of 3D environment 412A, view 415B of 3D environment 412B, and view 415C of 3D environment 412C, respectively, operating in the same physical environment 100 as FIGS. 1A-1C during a viewing of an anchored recording during a viewing session. For example, FIGS. 4A-4C represent a viewing session at three different periods of time while the user 402 walks in the physical environment 100 (e.g., a similar route as user 102 during the recording of content) and views an anchored recording. In particular, FIG. 4A, for a first period of time, illustrates user 402 (e.g., a viewer such as a visitor watching a recording of a video about statue 134 in a museum that was previously recorded by a docent) standing in front of the first wall hanging 132 and facing the statue 134. FIG. 4B, for a second period of time, illustrates user 402 standing in front of and facing the statue 134. FIG. 4C, for a third period of time, illustrates user 402 standing in front of the second wall hanging 136 and facing the statue 134.

The electronic device 410 includes one or more cameras, microphones, depth sensors, or other sensors that can be used to capture information about and evaluate the physical environment 100 and the objects within it, as well as information about the user 402 of the electronic device 410 (e.g., positional data of the user 402). The information about the physical environment 100 and/or user 402 may be used to provide visual and audio content during the viewing session. For example, a viewing session may provide views of a 3D environment (e.g., 3D environment 412A, 412B, and 412C) that is generated based on current camera images and/or depth camera images of the physical environment 100 from electronic device 410 as well as a representation 122 of user 102 (e.g., from FIGS. 1A-1C) based on camera images and/or depth camera images of the user 102 (e.g., while the user 102 records a video of himself or herself) captured by electronic device 110 at the time the content was recorded.

In the example illustrated in FIG. 4A, the electronic device 410 provides a view 415A that enables user 402 to view a representation 142 of the first wall hanging 132, a representation 144 of the statue 134, and a representation 122 (e.g., a generated avatar, an image, a video, etc.) of at least a portion of the user 102 (e.g., from mid-torso up) within a 3D environment 412A. For example, the representation 122 is a recording of a docent providing a recorded video or avatar that teaches the user 402 about the statue 134. Similarly, in the example illustrated in FIG. 4B, the electronic device 410 provides a view 415B that enables user 402 to view a representation 144 of the statue 134 and the representation 122 of the user 102 within a 3D environment 412B, and in the example illustrated in FIG. 4C, the electronic device 410 provides a view 415C that enables user 402 to view a representation 146 of the second wall hanging 136, a representation 144 of the statue 134, and the representation 122 of the user 102 within a 3D environment 412C.

In some implementations, each view 415 may include an indicator (e.g., a virtual arrow) to guide the user to the anchor object or to follow a similar route as the recorded content from the content creator (e.g., user 102 of FIG. 1, such as a docent during a guided tour of a museum or walk around the statue 134). Because the content recorded is anchored to a particular object or area, an indicator could assist the viewer (e.g., user 402) to show where the anchored object and thus the representation 122 about the anchor object is being shown. Otherwise, if the user 402 turns away from the anchored content being played, there will likely not be any recorded content to present to user 402 (e.g., the representation 122 of user 102). However, if there is associated audio content with the recording, then the user 402 may be able to hear the presentation of the docent (e.g., via spatialized audio) at or near the location of the anchored object/area, even though user 402 may not be currently looking at the anchored content. The indicator may be a virtual arrow pointing in a direction of the route that is intended for the user 402 to follow. The indicator may also be a virtual arrow pointing in a direction of the anchor object. However, in other examples, other visual indicators may be used to direct user 402 along the route associated with the recorded content. Additionally, or alternatively, spatialized audio may be used for an indicator to direct the user to a different anchored recording (e.g., "walk towards the direction of the next painting to the right for another video").

In some implementations, a view (e.g., view 415) may include an interactive element (e.g., a selectable virtual icon). For example, an interactive element (or several different elements) may be displayed that the user 402 can use to control different portions of the experience via user input. For example, the user can stop, pause, rewind, fast forward, skip a chapter, etc., through a particular portion of the anchored recording. Additionally, or alternatively, the user can use voice control to interact with the interactive elements or to control the viewing of the anchored recording during the experience (e.g., "skip this portion of the museum tour").

In some implementations, each 3D environment 412 is an XR environment that is based on a coordinate system that can be shared with other users (e.g., a virtual room for avatars for a multi-person viewing session). In other words, the coordinate system of the 3D environment 412 is different than the coordinate system of the physical environment 100 for user 402 (e.g., a generated avatar of content creator may be viewed differently with respect to another object). For example, the user 102 (e.g., the docent) may have recorded him or herself at a different position relative to one of the paintings (e.g., at a first position), however, the 3D environment 412 may position the representation 122 at a different anchored position relative to statue 134 (e.g., at a second position). For example, there may be an obstructed view for user 402 while viewing the representation 122, such as another visitor of the museum looking at the same painting. Thus, a viewing session instruction set may be able to move the position of the representation 122 to a different coordinate with respect to the anchored object/area (e.g., statue 134) with the view 415 of the 3D environment 412.

In some implementations, the anchored recording in each 3D environment 412 may entirely occupy the field of view for the user 402 (e.g., a fully immersive experience while wearing an HMD). For example, view 415 may include content (e.g., images, video, 3D reconstructions, or the like) from physical environment 100 captured by electronic device 110 at the time of recording. In this example, view 415 may not include a view of physical environment 100 at the time of playback (e.g., via pass-through video captured by electronic device 410 or as seen through a transparent/translucent display). Alternatively, in some implementations, the anchored recording in each 3D environment 412 may only occupy a portion of the entire field of view for the user 402. For example, view 415 may include content (e.g., images, video, 3D reconstructions, or the like) from physical environment 100 or a representation 122 of user 102 captured by electronic device 110 at the time of recording. In this example, the view may also include a view of physical environment 100 (e.g., via pass-through images captured by electronic device 410 or as seen through a transparent/translucent display) at the time of playback over which the recorded content is overlaid.

Figure 5:
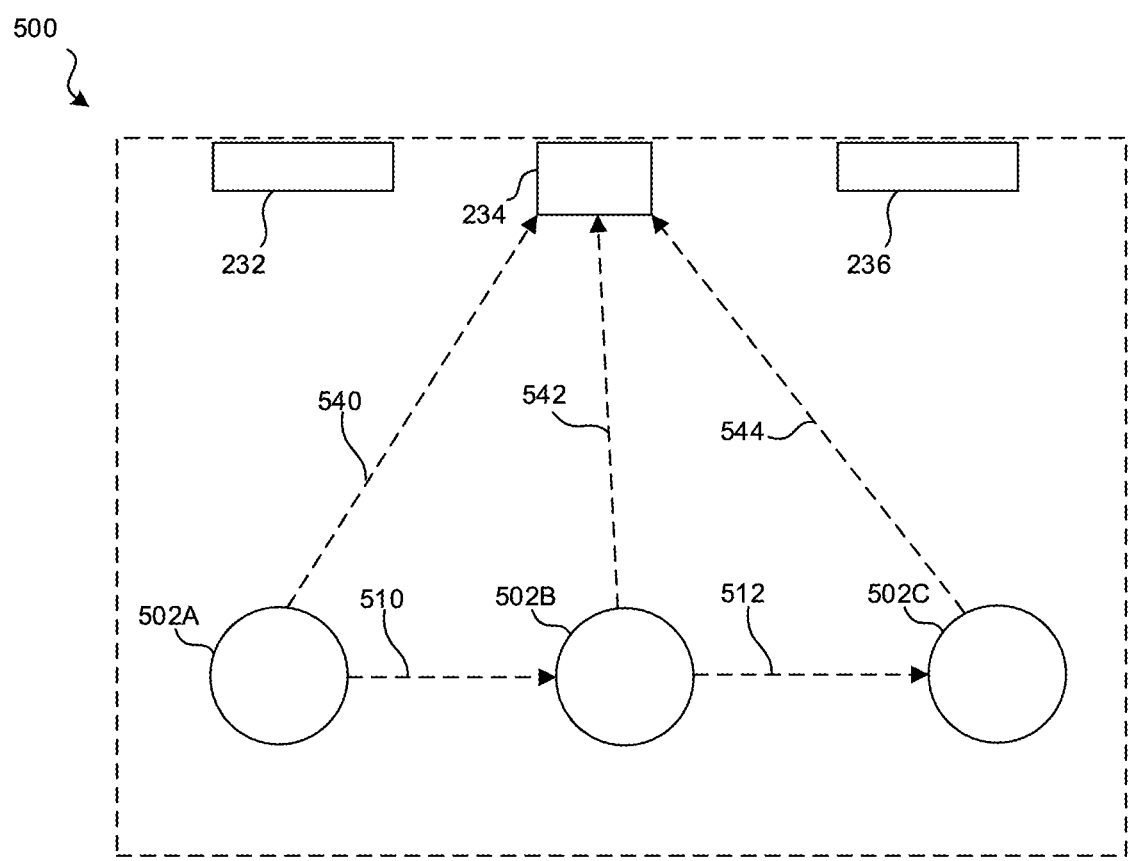
FIG. 5 illustrates an example location map based on the movement of the viewer of FIGS. 4A-4C in accordance with some implementations.

FIG. 5 illustrates an example location map 500 based on the movement of a viewer (e.g., user 402) of FIGS. 4A-4C (e.g., segment 510 and segment 512) in accordance with some implementations. The location map 500 illustrates a 2D top-down view of locations of representations of users or other representations of objects within a 3D environment. In this example, during an example of a viewing session of an anchored recording (e.g., a portion of the recorded content of FIGS. 1A-1C within the 3D environment 112A-112C, respectively), a viewing session instruction set executed on an electronic device (e.g., device 410), or networked through an external server, can generate a location map 500 based on the representations of the user 402, and objects (e.g., first wall hanging 132, statue 134, and second wall hanging 136). For example, location indicator 232 depicts a location for representation 142 of first wall hanging 132, location indicator 234 depicts a location for representation 144 of statue 134, and location indicator 236 depicts a location for representation 146 of second wall hanging 136 for the recorded content illustrated in FIGS. 1A-1C. The location map 500 further illustrates the respective placement for the user representation 502A as the user 402 moves during each respective time period. For example, as the user 402 moves to the second location illustrated in FIG. 4B (e.g., in front of the statue 134), the location map 500 illustrates path segment 510 of the movement of the user 402 to the location at representation 502B, and as the user 402 moves to the third location illustrated in FIG. 4C (e.g., in front of the second wall hanging 136), the location map 500 illustrates segment 512 of the movement of the user 402 to the location at representation 502C.

In an exemplary implementation, as the user 402 moves locations (e.g., walks around the museum and views a moving avatar speaking about statue 134, the anchor object), the system records user data such as positional information of the user 402 and/or device 410 in a coordinate space of the anchor area/object and tracks that information in the location map 500. For example, when the user 402 is at the location at representation 502A, anchor object positional information 540 (e.g., the location data of the user 402 or device 410 with respect to the coordinate space of the anchor object-statue 134) is acquired. Similarly, as the user moves during the recording, additional anchor position information is acquired, such as anchor object positional information 542 at the location at representation 502B and anchor object positional information 544 at the location at representation 502C. The location map 500 illustrates a tracking of the viewing session of FIGS. 4A-4C as a moving avatar is positioned relative to a recognized anchor in the viewing environment based on the anchor object positional information 540, 542, and 544.

FIGS. 6A-6C illustrate exemplary views of an electronic device during a viewing session by a viewer of a user representation based on an anchored recording, where each view is of an extended reality (XR) environment that includes a representation of the content creator of FIGS. 1A-1C, and a portion of the physical environment, in accordance with some implementations. FIGS. 6A-6C are similar to the exemplary views as discussed herein for FIGS. 4A-4C (and each additional implementation), except that the user 402 is now standing in the same location during the anchored recording as the moving avatar (e.g., representation 122 of user 102) proceeds to move to different positions while the user 102 speaks about the statue 134. For instance, FIGS. 6A-6C illustrate an exemplary electronic device 410 providing view 615A of 3D environment 612A, view 615B of 3D environment 612B, and view 615C of 3D environment 612C, respectively, operating in the same physical environment 100 as FIGS. 1A-1C during a viewing of an anchored recording during a viewing session. For example, FIGS. 6A-6C represent a viewing session at three different periods of time while the user 402 stands still and views an anchored recording. In particular, FIG. 6A, for a first period of time, illustrates user 402 (e.g., a viewer such as a visitor watching a recording of a video about statue 134 in a museum that was previously recorded by a docent) standing in front of the first wall hanging 132 and facing the statue 134. Similarly, FIGS. 6B and 6C, for a second and a third period of time, respectively, illustrate user 402 remaining in the same location as the first time period for FIG. 6A, e.g., standing in front of the first wall hanging 132 and facing the statue 134.

A viewing session may provide views of a 3D environment (e.g., 3D environment 612A, 612B, and 612C) that is generated based on current camera images and/or depth camera images of the physical environment 100 from electronic device 410 as well as a representation 122 of user 102 (e.g., from FIGS. 1A-1C) based on camera images and/or depth camera images of the user 102 (e.g., while the user 102 records a video of himself or herself) captured by electronic device 110 at the time the content was recorded. In the example illustrated in FIG. 6A, the electronic device 410 provides a view 615A that enables user 402 to view a representation 142 of the first wall hanging 132, a representation 144 of the statue 134, and a representation 122 (e.g., a generated avatar, an image, a video, etc.) of at least a portion of the user 102 (e.g., from mid-torso up) within a 3D environment 612A. For example, the representation 122 is a recording of a docent providing a recorded video or avatar that teaches the user 402 about the statue 134. Similarly, in the example illustrated in FIGS. 6B and 6C, the electronic device 410 provides a view 615B, 615C, respectively, that enables user 402 to view a representation 142 of the first wall hanging 132, a representation 144 of the statue 134, and the representation 122 of the user 102 within a 3D environment 612B, for a second and third time period, respectively. Thus, as illustrated in FIGS. 6A-6C, the viewer (user 402) is able to stand stationary and view a moving avatar (e.g., representation 122 of user 102) that is moving based on coordinates that are anchored to the anchor object (e.g., statue 134). Thus, the view of the avatar is not based on user's 402 movements, but on the viewpoint of the device 410 with respect to the anchored object. For example, the avatar may be positioned/orientated in the same positions/orientations as the user who provided a museum tour relative to a recognized object, room, or other physical environment, e.g., standing 3 feet to the right of the statue and facing west during a portion of the recording describing the statue.

Figure 7C:
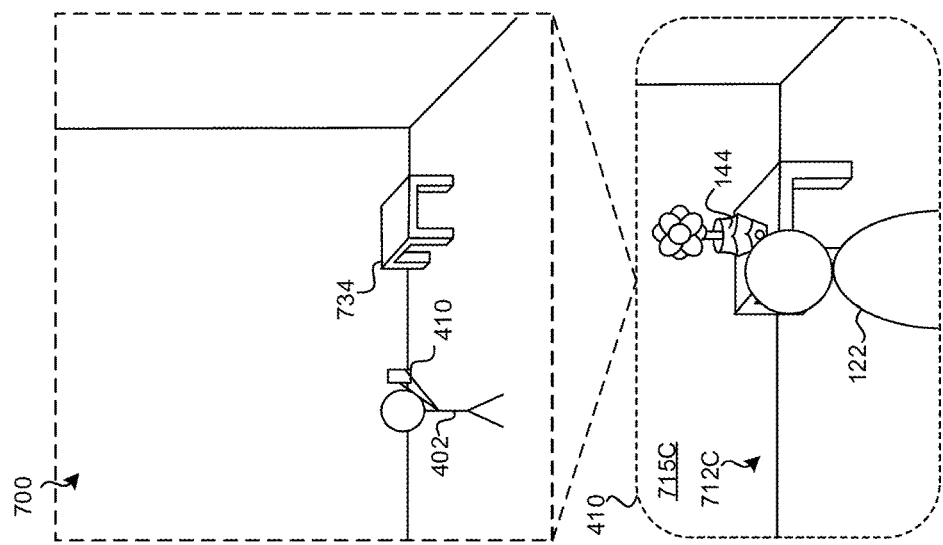
FIGS. 7A-7C illustrate exemplary views of an electronic device by a viewer of a user representation based on an anchored recording, in accordance with some implementations.
Figure 7B:
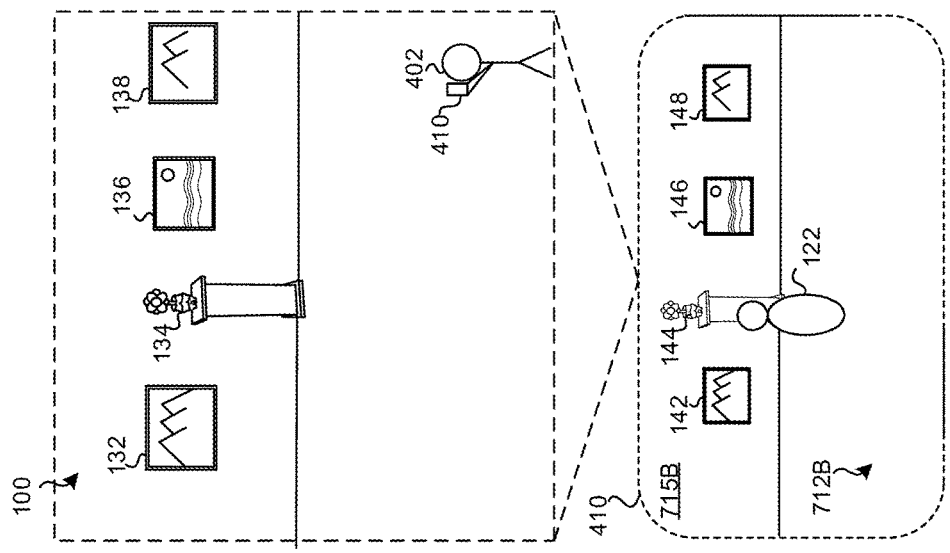
Figure 7A:
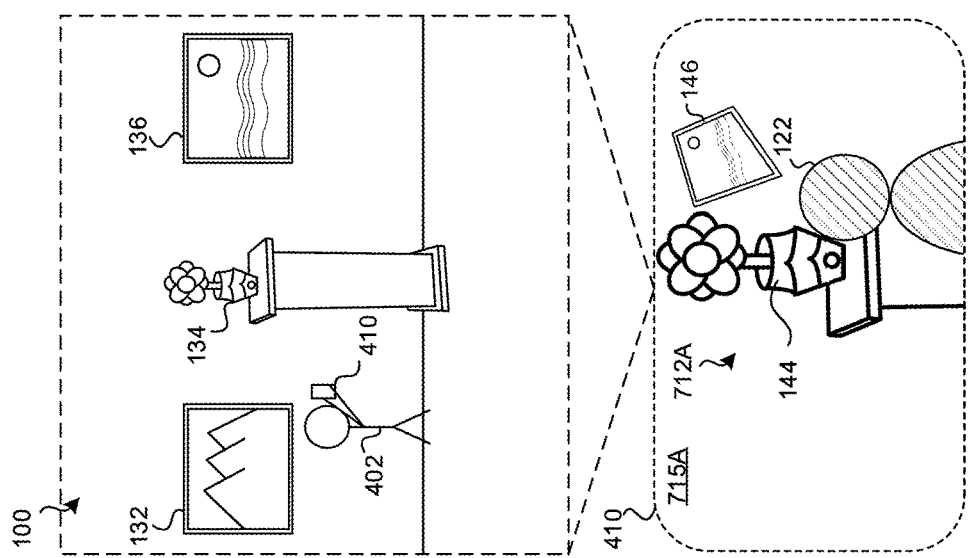

FIGS. 7A-7C illustrate exemplary views of an electronic device during a viewing session by a viewer of a user representation based on an anchored recording, where each view is of an XR environment that includes a representation of the content creator of FIGS. 1A-1C, and a portion of a physical environment, in accordance with some implementations. FIGS. 7A and 7B are similar to the exemplary views as discussed herein for FIGS. 4A-4C and FIGS. 6A-6C, as they are each within the same physical environment 100 (e.g., a museum that includes the statue 134), while FIG. 7C illustrates a different physical environment 700 (e.g., a viewer's bedroom). FIGS. 7A and 7B illustrate the user 402 standing in different locations than FIGS. 4A-4C and FIGS. 6A-6C during a viewing session of an anchored recording as the moving avatar (e.g., representation 122 of user 102) proceeds to move to different positions while the user 102 speaks about the statue 134. For instance, FIGS. 7A-7B illustrate an exemplary electronic device 410 providing view 715A of 3D environment 712A and view 715B of 3D environment 712B, respectively, operating in the same physical environment 100 as FIGS. 1A-1C, and FIG. 7C illustrates an exemplary electronic device 410 providing view 715C of 3D environment 712C operating in physical environment 700, during a viewing of an anchored recording during a viewing session. In particular, FIG. 7A, for a first period of time, illustrates user 402 (e.g., a viewer such as a visitor watching a recording of a video about statue 134 in a museum that was previously recorded by a docent) standing adjacent to and behind the statue 134 while facing the statue 134. FIG. 7B, for a second period of time, illustrates user 402 facing the statue 134 from a farther distance away than the previous examples (e.g., a back corner of the room in the museum). FIG. 7C, for a third period of time, illustrates user 402 in a different physical environment, such as the user's bedroom, facing the table 734 (e.g., the playback of the recording of the docent can be anchored to the location of the table 734).

A viewing session may provide views of a 3D environment (e.g., 3D environment 712A, 712B, and 712C) that is generated based on current camera images and/or depth camera images of the physical environment 100 or 700 from electronic device 410 as well as a representation 122 of user 102 (e.g., from FIGS. 1A-1C) based on camera images and/or depth camera images of the user 102 (e.g., while the user 102 records a video of himself or herself) captured by electronic device 110 at the time the content was recorded. In the example illustrated in FIG. 7A, the user 402 has moved to the side of the statue 134 and is viewing the statue, and thus the avatar, from a side or back view. The electronic device 410 provides a view 715A that enables user 402 to view a representation 146 of the second wall hanging 136, a representation 144 of the statue 134, and a representation 122 (e.g., a generated avatar, an image, a video, etc.) of at least a portion of the user 102 (e.g., from mid-torso up) within a 3D environment 712A. For example, the representation 122 is a recording of a docent providing a recorded video or avatar that teaches the user 402 about the statue 134.

In the example illustrated in FIG. 7B, the user 402 is standing in a corner of the museum such that the statue 134 in on another side that may be relatively far away (e.g., 30 feet away in a large museum room/space). The electronic device 410 provides a view 715B, that enables user 402 to view a representation 142 of the first wall hanging 132, a representation 144 of the statue 134, a representation 146 of the second wall hanging 136, a representation 148 of a third wall hanging 138, and the representation 122 of the user 102 within a 3D environment 712B, for a second time period.

In the example illustrated in FIG. 7C, the user 402 is located in a different physical environment (e.g., user's 402 bedroom), such that the user 402 obtains the anchored recording of the docent giving a tour or speech about the statue 134 and the user 402 wants to view the avatar of the docent and the statue 134. The electronic device 410 provides a view 715C, that enables user 402 to view a representation 144 of the statue 134 and the representation 122 of the user 102 within a 3D environment 712C (e.g., a virtual representation 144 of the statue 134). The representation 122 of the user 102 may be anchored to the 3D coordinates on the top of the table 734. Additionally, or alternatively, the user 402 (or the system) can select the playback location (e.g., a floating statue in the middle of the room, on the floor, on top of another flat surface, and the like). In some implementations, the representation 122 of the user 102 may be played back anchored to a replica of the statue 134. For example, as opposed to a virtual representation of the statue 134, the user 402 may choose another object (e.g., a physical replica model of the statue 134, or an object that is not related to the statue 134 such as stuffed animal) to use as the location coordinates for the anchor point for the representation 122 of the user 102 (e.g., the avatar) to playback based on those coordinates. Thus, the playback of the avatar of the docent giving a tour/presentation about the statue 134 can be anchored to any 3D coordinate location, such as a specific object or just a specific 3D coordinate in a space of a room.

In the example of FIGS. 1-7, the electronic devices 110, 410 are illustrated as a hand-held device. The electronic devices 110, 410 may be a mobile phone, a tablet, a laptop, so forth. In some implementations, electronic devices 110, 410 may be worn by a user. For example, electronic devices 110, 410 may be a watch, a head-mounted device (HMD), head-worn device (glasses), headphones, an ear mounted device, and so forth. In some implementations, functions of the devices 110, 410 are accomplished via two or more devices, for example a mobile device and base station or a head mounted device and an ear mounted device. Various capabilities may be distributed amongst multiple device, including, but not limited to power capabilities, CPU capabilities, GPU capabilities, storage capabilities, memory capabilities, visual content display capabilities, audio content production capabilities, and the like. The multiple devices that may be used to accomplish the functions of electronic devices 110, 410 may communicate with one another via wired or wireless communications and/or via an intermediary device such as a viewing session server.

In some implementations, the electronic devices 110, 410 include a position tracking instruction set to track a position of a content creator or viewer (e.g., user 102, 402, or his/her device 110, 410, respectively) relative to a 3D environment. This may involve tracking a position or movement of the viewer in a physical environment (e.g., physical environment 100), virtual environment, or XR environment. Position, including 2D or 3D coordinate information or orientation, may be tracked based on information from I/O device(s) and sensor(s) or image sensor system(s). In some implementations, the position tracking instruction set is executed to evaluate images of a physical environment, recognize objects in the physical environment, and determine a viewer position relative to the objects in the physical environment. In some implementations, the viewer position is additionally or alternatively tracked using an inertial measurement unit (IMU), an accelerometer, a magnetometer, or a gyroscope. In some implementations, a visual inertial odometry (VIO) technique or a simultaneous localization and mapping (SLAM) technique is applied to track viewer position. In some implementations, the position tracking instruction set implements a machine learning model that uses image data or sensor data to track viewer position.

According to some implementations, the electronic devices 110, 410 generate and present an extended reality (XR) environment to one or more users during a viewing session.

Figure 8:
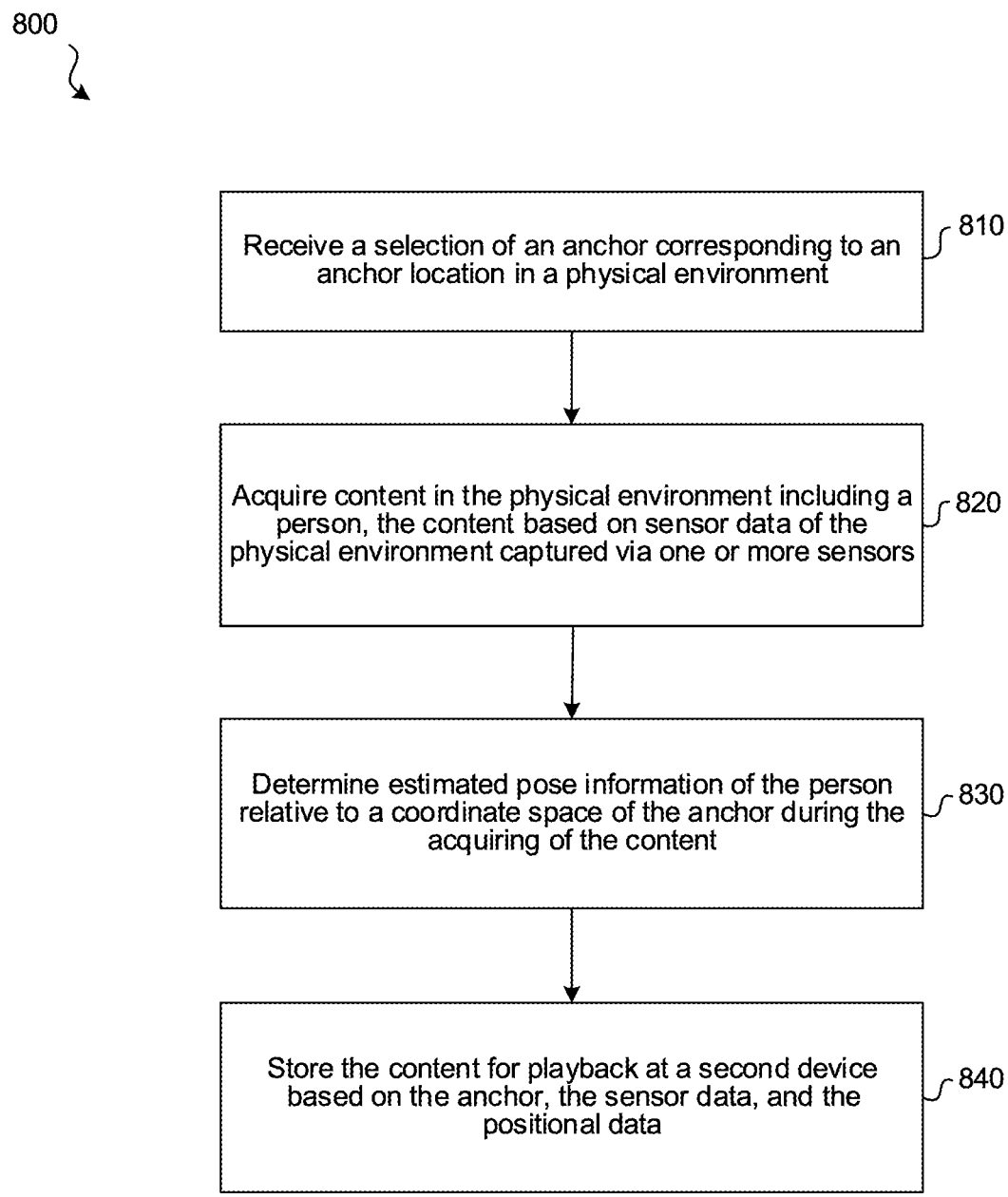
FIG. 8 is a flowchart illustrating a method for selecting an anchor and recording content and positional data of a user moving relative to a coordinate space of the selected anchor in accordance with some implementations.

FIG. 8 is a flowchart illustrating a method 800 for recording positional data of a user moving relative to a coordinate space of a selected anchor in accordance with some implementations. In some implementations, a device, such as electronic device 110 or electronic device 410, or a combination of the two, performs method 800. In some implementations, method 800 is performed on a mobile device, desktop, laptop, HMD, ear-mounted device or server device. The method 800 is performed by processing logic, including hardware, firmware, software, or a combination thereof. In some implementations, the method 800 is performed on a processor executing code stored in a non-transitory computer-readable medium (e.g., a memory).

At block 810, at a first device (e.g., a creator's device such as device 110) having a processor and one or more sensors, the method 800 receives a selection of an anchor (e.g., an area in a room or an object) corresponding to an anchor location in a physical environment. For example, a content creator, such as a museum guide about to record a tour (e.g., user 102) can select an object (e.g., statue 134) or an area on a display of a device (e.g., device 110) as anchor location.

In some implementations, the selection of the anchor is based on user input. For example, a user selecting the representation 144 of the statue 134 on the view 115 of 3D environment 112 of FIG. 1. In some implementations, the selection of the anchor is based on an audio cue from the person. For example, a docent recording the content (e.g., tour guide video) may say "record with the statue as the anchor", and the system, via an object detection technique, can determine to use the statue 134 as the anchor, because the representation 144 of the statue 134 is the only statue within the view 115 of FIG. 1.

In some implementations, the selection of the anchor is based on object detection. For example, based on a recognition by the device of a previously known object (e.g., a previous recording of the object used as an anchor) or a well-known object (e.g., a famous object such as the painting of the Mona Lisa), the system could provide a notification to the creator to ask whether they want to anchor his or her content to that recognized object.

In some implementations, the selection of the anchor is based on content of audio of the person associated with a physical object in the physical environment. For example, the system can determine that the content creator (e.g., user 102) is speaking about a particular object based on the syntax of the spoken audio (e.g., via transcription algorithms) and automatically record the content with the particular object selected as the anchor.

At block 820, the method 800 acquires content in the physical environment including a person, the content based on sensor data of the physical environment captured via the one or more sensors. The content may include acquiring a video or other time-based content. The person may be a speaker being tracked by a recording device. In some implementations, the sensor data may include capturing skeletal pose information/estimation of the person relative to the physical environment to know what the speaker has done relative to the physical location (e.g., a museum).

In some implementations, the content includes audio associated with the person moving relative to the coordinate space of the anchor. For example, the sensor data may include voice/audio of a speaker, a docent recording a museum tour (e.g., user 102). In some implementations, the content includes image data associated with the person. The images may be used to create an avatar for the user 102, or the avatar may already have been created.

In some implementations, the sensor data may include obtaining spatial data of a scene in the physical environment (e.g., 3D point cloud data). Additionally, or alternatively, the content may be recorded and/or generated using multiple devices of multiple users. In some implementations, the first device and/or the second device is a HMD.

At block 830, the method 800 determines estimated pose information of the person relative to a coordinate space of the anchor during the acquiring of the content. In some implementations, the estimated pose information was obtained via the one or more sensors while acquiring the content on the first device (e.g., a creator's device such as device 110).

In some implementations, determining the estimated pose information includes determining recorded positional data including positions of the first device associated with movements of the person as the first device is moved within the physical environment. The recorded positional data may define the anchor (e.g., 3D room representation/features, object information such as type, size, features, 3D representation, unique features, world coordinate information, and the like). The position data may include the pose of the device and/or viewing direction of the person. The positional data may define rooms, space-based bookmarks, space-based playback criteria. Additionally, or alternatively, the recorded data may be recorded and/or generated using multiple devices of multiple users.

In some implementations, the estimated pose information includes a pose of a viewing direction of the user or the first device. For example, the first device (e.g., device 110) can capture skeletal pose information/estimation of the person (e.g., user 102) relative to the physical environment to know what the user (tour guide) has done relative to the museum/physical environment, and the viewer (e.g., using device 410) can view the same pose of the avatar and viewing direction as intended by the user that created the content (e.g., a docent using device 110).

At block 840, the method 800 stores the content for playback at a second device (e.g., the viewer's device) based on the anchor location, the sensor data, and the positional data. For example, a visitor in a museum (e.g., a viewer using the second device, such as device 410) can watch the playback of the content created by the docent (e.g., a creator using the first device), where the playback is relative to the coordinate space of the selected anchor. In some implementations, the first device stores the pose of the person (e.g., user 102) relative to the anchor. Additionally, the first device may store audio, video, or some form of avatar reconstruction of the user. Moreover, the first device may store data necessary for the viewing device to identify the anchor (e.g., images of the anchor, a computer vision model of the anchor, etc.).

In some implementations, the content includes a visual representation of the anchor. For examples, the recorded content may include image data of the anchor (e.g., representation 144 of statue 134). Additionally, or alternatively, the content may be stored as a 3D model representation (e.g., a 3D reconstruction of the statue 134) instead of using image data.

In some implementations, the techniques described herein can segment the person from the video (e.g., user 102), segment an anchor from the video, generate a 3D reconstruction of a person (e.g., user 102), generate a 3D reconstruction of the anchor, and the like. In these examples, the content stored at block 840 can include just the representations (segmented video, 3D reconstruction, avatar, etc.) of the person and the anchor and exclude other portions of the content. Thus, the recorded data would include only the selected object(s) that are to be segmented. For example, the recorded data would include images of the speaker (e.g., user 102) and the anchor object (e.g., statue 134).

In some implementations, storing the content for playback includes providing a representation of the person (e.g., an avatar) in place of a view of the person. In some implementations, the representation of the person (e.g., an avatar) is based on physiological data of the person obtained via the one or more sensors. For example, physiological sensors (e.g., heart rate, eye gaze, etc.) can detect the person (e.g., the docent recording a museum tour) is happy and therefore the generated avatar can mimic a person as smiling/happy. In some implementations, at least a portion of the person includes facial movements as the first device is moved within the physical environment during the acquiring of the content, and the representation of the person mimics the facial movements. For example, camera sensors can detect the person (e.g., the docent recording a museum tour) is smiling and therefore the generated avatar can mimic the smile.

In some implementations, storing the content for playback includes providing a guiding indicator (e.g., indicator 350 of FIG. 3) to guide a viewer (e.g., user 402) to move the second device (e.g., device 410) to a new position associated with a movement of the person (e.g., user 102). The guiding indicator may include a bookmark, footprint, arrow, etc. In some implementations, the guiding indicator includes a spatialized audio element that guides the viewer to the new position (e.g., "please move the next painting to your right").

In some implementations, the content includes audio associated with the person (e.g., the representation 122 of user 102, such as a docent talking during the guided tour) and storing the content for playback includes playback of the audio associated with the movement of the person during the recording. For example, spatialized audio may include a creator (a docent) narrating while recording the experience in the museum (e.g., "Look over here and you'll see X.").

In some implementations, the content is generated based on recorded data from the first device and recorded data from a plurality of other devices. In some implementations, the first device and/or the second device is a HMD.

Figure 9:
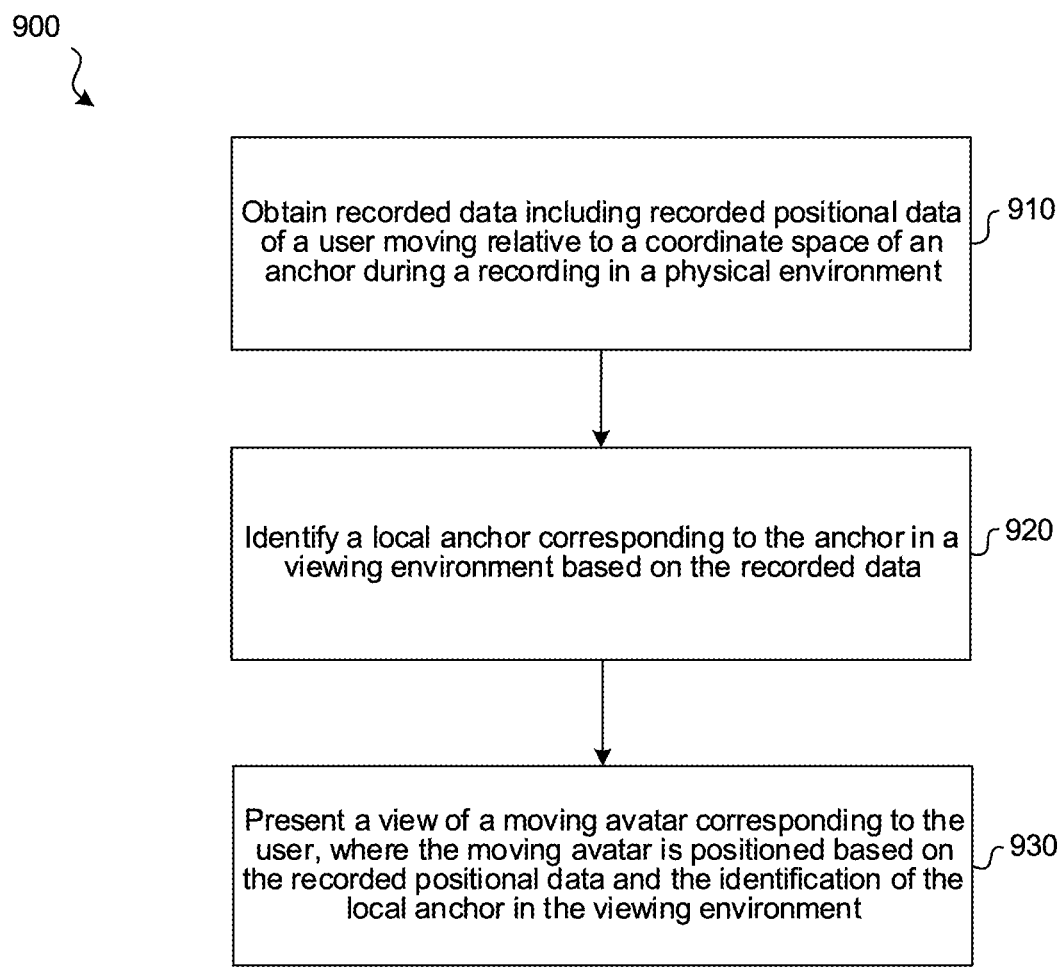
FIG. 9 is a flowchart illustrating a method for presenting a view of an avatar corresponding to a user based on recorded positional data and the identification of a local anchor in the viewing environment in accordance with some implementations.

FIG. 9 is a flowchart illustrating a method 900 for presenting a view of an avatar corresponding to a user based on recorded positional data and the identification of a local anchor in the viewing environment in accordance with some implementations. In some implementations, a device, such as electronic device 110 or electronic device 410, or a combination of the two, performs method 900. In some implementations, method 900 is performed on a mobile device, desktop, laptop, HMD, ear-mounted device or server device. The method 900 is performed by processing logic, including hardware, firmware, software, or a combination thereof. In some implementations, the method 900 is performed on a processor executing code stored in a non-transitory computer-readable medium (e.g., a memory).

At block 910, at a first device (e.g., a viewer's device such as device 410) having a processor, the method 900 obtains obtaining recorded data (e.g., recorded user data) including recorded positional data of a user moving relative to a coordinate space of an anchor (a room or object) during a recording in a physical environment. The recorded positional data was obtained via one or more sensors on a second device (e.g., a creator's device such as device 110) during the recording. The recorded data may define the anchor (e.g., 3D room representation/features, object information such as type, size, features, 3D representation, unique features, world coordinate information, and the like). The position data may include the pose of the device and/or viewing direction of the creator/docent. The positional data may define rooms, space-based bookmarks, space-based playback criteria. Additionally, or alternatively, the recorded data may be recorded and/or generated using multiple devices of multiple users.

In some implementations, the recorded positional data includes a pose of a viewing direction of the user or second device. For example, the second device (e.g., device 110) can capture skeletal pose information/estimation of the user (e.g., user 102) relative to the physical environment to know what the user (tour guide) has done relative to the museum/physical environment, and the viewer (e.g., using device 410) can view the same pose of the avatar and viewing direction as intended by the user that created the content (e.g., a docent using device 110).

In some implementations, the recorded positional data includes spatially-based virtual content or bookmarks associated with the physical environment. For example, as the viewer walks around a room or down a hallway (in a museum), there may be virtual content, such as notes (bookmarks), placed around the area that the user can select or walk towards to activate the associated recorded content for that particular bookmark. The bookmarks allow the user to follow different paths and not just one particular path (e.g., choose your own adventure books, also known as secret path books).

In some implementations, the content is generated based on recorded data from the second device and recorded data from a plurality of other devices. In some implementations, the first device and/or the second device is a HMD.

In some implementations, the positional data identifies 6 degrees of freedom positional information of a person within the physical environment, e.g., where the speaker is standing, which direction the speaker is facing, etc. In one example, the person or creator may be a docent recording a tour in a museum while holding a device that records images of the speaker giving the tour as well as positional data about the person as the he or she gives the tour, which is being recorded. The recorded content and positional data may be associated with one another for later use generating 3D content such as a playback view (e.g., 2D or 3D) of the speaker giving the tour. The use of the recorded content (e.g., images, depth, etc.) and positional data may enable a playback view at the same location and/or orientation within the same physical environment. The positional data may define rooms, space-based bookmarks, space-based playback criteria. The recorded positional data was obtained via one or more sensors on the first device during the recording.

In some implementations, the sensor data may include obtaining spatial data of a scene in the physical environment (e.g., 3D point cloud data). Additionally, or alternatively, the content may be recorded and/or generated using multiple devices of multiple users.

At block 920, the method 900 identifies a local anchor corresponding to the anchor in a viewing environment based on the recorded data. For example, a local anchor, such as the actual statue (e.g., statue 134) or a replica of the statue (e.g., a fake statue or a model of statue 134), may be identified at the first device (e.g., a viewer's device).

In some implementations, identifying the local anchor in the viewing environment includes identifying a pose of the local anchor in the viewing environment relative to the first device (e.g., viewing device, such as device 410). In some examples, as illustrated in FIG. 7C, the representation 122 of the user 102 may be played back anchored to a virtual replica of the statue 134. In other examples, rather than using a virtual representation of the statue 134, the user 402 may choose another object (e.g., a physical replica model of the statue 134, or an object that is not related to the statue 134 such as stuffed animal) to use as the location coordinates for the anchor point for the representation 122 of the user 102 (e.g., the avatar) to playback based on those coordinates. Thus, the playback of the avatar of the docent giving a tour/presentation about the statue 134 can be centered around any coordinate location such as a specific object or just a specific 3D coordinate in a room.

In some implementations, identifying the local anchor in the viewing environment is based on a match process that matches features associated with the viewing environment with features associated with the physical environment. For example, the systems described herein may utilized 3D data, depth data, object recognition data, and the like, for a match process that matches features associated with the viewing environment with features associated with the physical environment.

At block 930, the method 900 presents a view of a moving avatar corresponding to the user, wherein the moving avatar is positioned based on the recorded positional data and the identification of the anchor in the viewing environment. For example, the avatar may be positioned three feet to the right of the statue, or the avatar may be based on the recorded data (e.g., images in the recording of the user) and/or other user data (e.g., a separately recorded 3D model of the user).

In some implementations, the recorded data includes a visual representation of the anchor. For example, the visual representation may include images, 3D reconstruction of the anchor (e.g., a 3D model), and the like. In some implementations, the visual representation of the anchor is used to identify the local anchor (e.g., using computer vision model techniques). In some implementations, presenting the view includes presenting the visual representation of the anchor. For example, as illustrated in FIG. 7C, a virtual representation 144 of the statue 134 is displayed in the viewing environment 712C of the device 410 (e.g., viewer's device).

In some implementations, in accordance with identifying the local anchor in the viewing environment, forgo presenting the visual representation of the anchor. For example, while viewing the representation 144 of the statue 134 (e.g., in an adjacent room), a viewer (e.g., user 402), may move to the physical location of the statue 134, and the viewing environment (e.g., environment 712), may be updated to include a view of the actual statue 134, thus the virtual representation 144 of the statue 134 may be removed, since the viewer may now include a "live" look at the actual statue in the viewing environment (e.g., pass through video, live video feed, etc.).

In some implementations, identifying the local anchor in the viewing environment includes receiving a selection of a physical object in the viewing environment, where the selected physical object is identified as the local anchor. For example, a viewer may choose to playback the recorded content anchored to a particular object so that the viewing environment would appear anchored to the physical object. For example, a smaller model/replica (e.g., a toy) of the statue 134 could be selected by a viewer as an anchor location such that playback of the recorded content would show the representation of the creator as giving a speech about the statue 134 but anchored to the location of the model/replica of the statue 134. Additionally, the selected physical object used as an anchor location can be any objection or 3D point in the physical environment, as using a replica/model of the statue would be to use a similar item. Thus, a visual representation (e.g., a 3D model) could be displayed overlayed on the view of the selected physical object such that the viewer would see the visual representation (e.g., a 3D model), but the view of the selected physical object would be obstructed.

In some implementations, identifying the local anchor in the viewing environment includes a request to present a visual representation of the anchor, where the visual representation of the anchor is identified as the local anchor. For example, a creator may be capturing a video of a tour about a statue (e.g., statue 134), and the recorded data may include obtaining a visual representation of the statue to use as the visual representation. The viewer (e.g., at device 410), may be able to play back the recorded video of the creator and select a request to present the visual representation (e.g., a 3D model stored in the recorded data) of the statue 134 at the anchor location. For example, the viewer may not be at the same location as the creator and may be at physical location of a replica statue (e.g., even a small fake model of the statue). But when the viewer selects playback of the creator video, the viewer can also choose the view the representation of the anchor so they can see a representation of the actual statue 134 and not see the replica or toy statue that he or she is using to anchor the playback of the recording.

In some implementations, the avatar can be generated based on data separate from the recorded data and thus the viewer can walk around and view the moving avatar from different viewpoints. For example, as illustrated in FIG. 6A, the user 402 walked around the back of the statue 134 and saw the back of the avatar even if the back of the user 102 wasn't recorded. The recorded user data can include recorded face, lip, eyes, etc. data and/or physiological data used to animate the avatar, by providing animated face/lip/hand/body movements and expressions synchronized with the spoken audio and recorded user emotions.

In some implementations, the recorded content is anchored to an anchor (e.g., statue 134) or replicas/instances of the anchor. For example, the user representation may be positioned/oriented relative to a replica of the statue, and providing playback based on the coordinates of that anchor location. An anchor can be moved to an anchor location such that the playback is viewed relative to that anchor location.

In some implementations, the avatar is presented based the obtained recorded data. For example, the avatar of the user may be generated based on image data obtained from the recording of the user during the tour guide. Alternatively, in some implementations, the avatar is presented based on a separately recorded three-dimensional (3D) model of the user. For example, the positional information of the location of the user during the recording may be used to present a previously generated avatar that is presented in the view. For example, a higher quality avatar of the user may be created prior to the recording of the tour that is then placed in the viewing at the first device based on the positional information recorded by the user. Thus, the viewer would see a higher quality avatar, but hear the recording of the tour guide at the location the tour guide recorded the tour (e.g., while walking around and discussing the statue 134).

In some implementations, presenting the view of the moving avatar includes determining a distance between the a position of the first device and the local anchor in the viewing environment, and presenting the view of the moving avatar when the determined distance is within a threshold. For example, the presentation may pause, rewind, continue, etc. based on whether the viewer is on/within a threshold distance from the anchor, moving forward/back on the anchor, etc. If the user walks away from the anchor, the presentation of the avatar may pause or disappear and options for alternative recordings/memories may be presented. In some implementations, presenting the avatar is further based on user input. In some implementations, presenting the avatar includes presenting additional content associated with a different anchor.

In some implementations, presenting the view of the moving avatar includes displaying a guiding indicator to guide a viewer (e.g., user 402) to move the first device (e.g., device 410) to a new position associated with the local anchor. The guiding indicator may include a bookmark, footprint, arrow, etc. In some implementations, the guiding indicator includes a spatialized audio element that guides the viewer to the new position associated with a different anchor, or a different view of the same anchor (e.g., "please move the next painting to your right").

In some implementations, the recorded data includes audio associated with the user moving relative to the coordinate space of the anchor (e.g., the representation 122 of user 102, such as a docent talking during the guided tour) and presenting the view of the moving avatar includes playback of the audio associated with the user moving relative to the coordinate space of the anchor. For example, spatialized audio may include a creator (a docent) narrating while recording the experience in the museum (e.g., "Look over here and you'll see the statue X.").

In some implementations, there are multiple viewing modes for the presenting a view of the avatar (e g., snow globe 3D, over the shoulder view 2D, etc.). In an exemplary implementation, the presenting the view of the moving avatar includes presenting the avatar in a first presentation mode, the method 900 further includes, in accordance with a determination to switch the first presentation mode to a second presentation mode, presenting the playback of the content in the second presentation mode. For example, based on user input, the viewer (e.g., user 402) selects a snow globe 3D or over the shoulder view 2D, etc. of the user representation 122.

In some implementations, the presenting a view of the avatar may include an interactive element (e.g., a selectable virtual icon, or a drop-down menu with a list of items). For example, an interactive element (or several different elements) may allow a user to control different portions of the experience via user input. For example, the user can stop, pause, rewind, fast forward, skip a chapter, etc., through a particular portion of content. Additionally, or alternatively, the user can use voice control to interact with the interactive elements or to control the viewing of the content during the experience (e.g., "skip this portion of the museum tour.").

In some implementations, the view includes an image, video, or 3D reconstruction of the physical environment obtained via the one or more sensors on the second device during the recording. In some implementations, the view includes one or more virtual objects associated with the physical environment. In some implementations, presenting the view of the moving avatar includes presenting the moving avatar in an XR environment.

Figure 10:
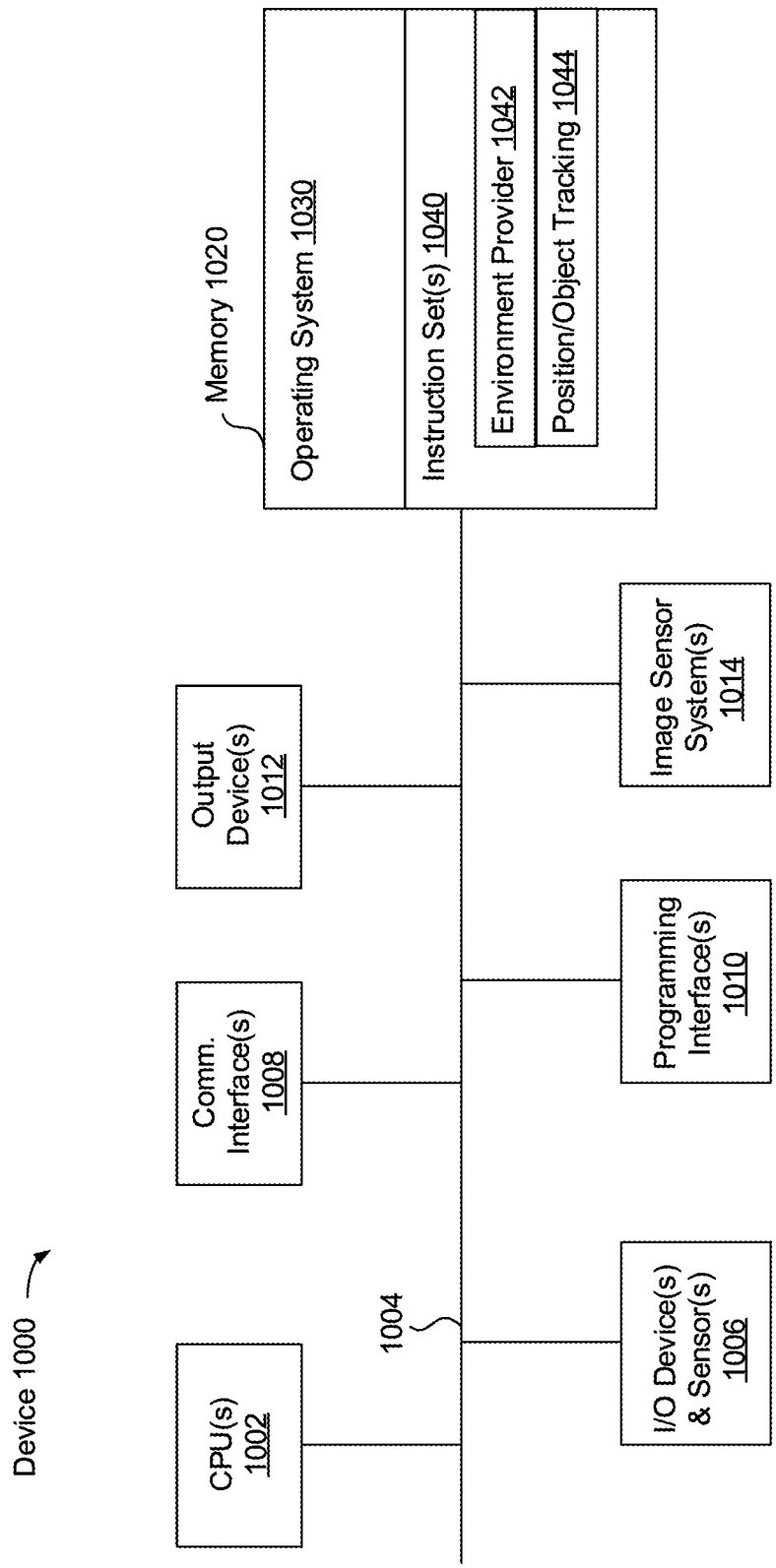
FIG. 10 is a block diagram of an electronic device in accordance with some implementations.

FIG. 10 is a block diagram of electronic device 1000. Device 1000 illustrates an exemplary device configuration for electronic device 110 or electronic device 410. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 1000 includes one or more processing units 1002 (e.g., microprocessors, ASICs, FPGAs, GPUS, CPUs, processing cores, and/or the like), one or more input/output (I/O) devices and sensors 1006, one or more communication interfaces 1008 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 12C, and/or the like type interface), one or more programming (e.g., I/O) interfaces 1010, one or more output device(s) 1012, one or more interior and/or exterior facing image sensor systems 1014, a memory 1020, and one or more communication buses 1004 for interconnecting these and various other components.

In some implementations, the one or more communication buses 1004 include circuitry that interconnects and controls communications between system components. In some implementations, the one or more I/O devices and sensors 1006 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device (s) 1012 include one or more displays configured to present a view of a 3D environment to the user. In some implementations, the one or more output device(s) 1012 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 1000 includes a single display. In another example, the device 1000 includes a display for each eye of the user.

In some implementations, the one or more output device (s) 1012 include one or more audio producing devices. In some implementations, the one or more output device(s) 1012 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations. The one or more output device(s) 1012 may additionally or alternatively be configured to generate haptics.

In some implementations, the one or more image sensor systems 1014 are configured to obtain image data that corresponds to at least a portion of a physical environment. For example, the one or more image sensor systems 1014 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 1014 further include illumination sources that emit light, such as a flash. In various implementations, the one or more image sensor systems 1014 further include an on-camera image signal processor (ISP) configured to execute a plurality of processing operations on the image data.

The memory 1020 includes high-speed random-access memory, such as DRAM, SRAM, DDR RAM, or other random-access solid-state memory devices. In some implementations, the memory 1020 includes non-volatile memory, such as one or more magnetic disk storage devices, optical disk storage devices, flash memory devices, or other non-volatile solid-state storage devices. The memory 1020 optionally includes one or more storage devices remotely located from the one or more processing units 1002. The memory 1020 includes a non-transitory computer readable storage medium.

In some implementations, the memory 1020 or the non-transitory computer readable storage medium of the memory 1020 stores an optional operating system 1030 and one or more instruction set(s) 1040. The operating system 1030 includes procedures for handling various basic system services and for performing hardware dependent tasks. In some implementations, the instruction set(s) 1040 include executable software defined by binary information stored in the form of electrical charge. In some implementations, the instruction set(s) 1040 are software that is executable by the one or more processing units 1002 to carry out one or more of the techniques described herein.

The instruction set(s) 1040 include an environment provider instruction set 1042 configured to, upon execution, provide a view of a 3D environment, for example, during a viewing session, as described herein. The instruction set(s) 1040 further include a position/object tracking instruction set 1044 configured to, upon execution, track a position of a content creator or viewer (e.g., the user 102, 402, or his/her device 110, 410, respectively) relative to a 3D environment and/or track an object as an anchored position (e.g., statue 134). The instruction set(s) 1040 may be embodied as a single software executable or multiple software executables.

Although the instruction set(s) 1040 are shown as residing on a single device, it should be understood that in other implementations, any combination of the elements may be located in separate computing devices. Moreover, FIG. 10 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of sensor data that may include user data to improve a user's experience of an electronic device. The present disclosure contemplates that in some instances, this gathered data may include personal information data that uniquely identifies a specific person or can be used to identify interests, traits, or tendencies of a specific person. Such personal information data can include movement data, physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
    at a first device having a processor:
        obtaining recorded data comprising recorded content and positional data specifying a position and movement of a user relative to a coordinate space of an anchor during a recording in a physical environment, wherein the recorded positional data was obtained via one or more sensors on a second device during the recording;
        identifying, in a viewing environment based on the recorded data, a local anchor; and
        presenting a view of a moving user representation corresponding to the user based on the recorded content, wherein the moving user representation is positioned and moved based on the position and movement of the user specified in the recorded positional data and the identification of the local anchor in the viewing environment, wherein the view of the moving user representation is presented at a later point in time than the recorded data.

2. The method of claim 1, wherein the recorded positional data is based on estimated pose information of the user relative to the position of the anchor in the physical environment.

3. The method of claim 1, wherein identifying the local anchor in the viewing environment comprises identifying a pose of the local anchor in the viewing environment relative to the first device.

4. The method of claim 1, wherein identifying the local anchor in the viewing environment is based on a match process that matches features associated with the viewing environment with features associated with the physical environment.

5. The method of claim 1, wherein the recorded data further comprises image data associated with the user and wherein the user representation is presented based on the image data.

6. The method of claim 1, wherein the recorded data comprises a visual representation of the anchor, the visual representation of the anchor is used to identify the local anchor, and presenting the view comprises presenting the visual representation of the anchor.

7. The method of claim 6, wherein in accordance with identifying the local anchor in the viewing environment, the method forgoes presenting the visual representation of the anchor.

8. The method of claim 1, wherein identifying the local anchor in the viewing environment comprises receiving a selection of a physical object in the viewing environment, wherein the selected physical object is identified as the local anchor.

9. The method of claim 1, wherein identifying the local anchor in the viewing environment comprises a request to present a visual representation of the anchor, wherein the visual representation of the anchor is identified as the local anchor.

10. The method of claim 1, wherein the user representation is presented based on a separately recorded three-dimensional (3D) model of the user.

11. The method of claim 1, wherein presenting the view of the moving user representation comprises:
determining a distance between a position of the first device and the local anchor in the viewing environment; and
presenting the view of the moving user representation when the determined distance is within a threshold.

12. The method of claim 1, wherein presenting the view of the moving user representation is further based on user input.

13. The method of claim 1, wherein presenting the view of the moving user representation comprises presenting additional content associated with a different anchor.

14. The method of claim 1, wherein presenting the view of the moving user representation comprises displaying a guiding indicator to guide a viewer to move the first device to a new position associated with the local anchor, wherein the guiding indicator includes a spatialized audio element that guides the viewer to the new position relative to the local anchor.

15. The method of claim 1, wherein presenting the view of the moving user representation comprises presenting the user representation in a first presentation mode, the method further comprising:
in accordance with a determination to switch the first presentation mode to a second presentation mode, presenting the user representation in the second presentation mode.

16. The method of claim 1, wherein the recorded data comprises audio associated with the position and movement of the user relative to the coordinate space of the anchor, and wherein presenting the view of the moving user representation comprises playback of the audio associated with the position and movement of the user relative to the coordinate space of the anchor.

17. The method of claim 1, wherein the user representation comprises a virtual user representation that guides a viewer to move the first device to a new position in accordance with the recorded positional data of the position and movement of the user relative to the coordinate space of the anchor.

18. The method of claim 1, wherein the user representation is based on physiological data of the user obtained via the one or more sensors.

19. The method of claim 1, wherein at least a portion of the recorded data comprises facial movements of the user as the second device is moved within the physical environment, and wherein the user representation mimics the facial movements during the presenting of the view of the moving user representation.

20. The method of claim 1, wherein the recorded positional data comprises:
a pose of a viewing direction of the second device; or
a spatially-based bookmark associated with the physical environment.

21. The method of claim 1, wherein the recorded positional data comprises playback criteria associated with the physical environment and presenting the view of the moving user representation is based on the playback criteria.

22. The method of claim 1, wherein the view is presented based on recorded data from the first device and recorded data from a plurality of other devices.

23. The method of claim 1, wherein obtaining the recorded data comprises obtaining spatial data of a scene in the physical environment.

24. A system comprising:
a first device;
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
obtaining, at a first device, recorded data comprising recorded content and positional data specifying a position and movement of a user relative to a coordinate space of an anchor during a recording in a physical environment, wherein the recorded positional data was obtained via one or more sensors on a second device during the recording;
identifying, in a viewing environment based on the recorded data, a local anchor; and
presenting a view of a moving user representation corresponding to the user based on the recorded content, wherein the moving user representation is positioned and moved based on the position and movement of the user specified in the recorded positional data and the identification of the local anchor in the viewing environment, wherein the view of the moving user representation is presented at a later point in time than the recorded data.

25. A non-transitory computer-readable storage medium storing program instructions executable via one or more processors to perform operations comprising:

obtaining, at a first device, recorded data comprising recorded content and positional data specifying a position and movement of a user relative to a coordinate space of an anchor during a recording in a physical environment, wherein the recorded positional data was obtained via one or more sensors on a second device during the recording;

identifying, in a viewing environment based on the recorded data, a local anchor; and presenting a view of a moving user representation corresponding to the user based on the recorded content, wherein the moving user representation is positioned and moved based on the position and movement of the user specified in the recorded positional data and the identification of the local anchor in the viewing environment, wherein the view of the moving user representation is presented at a later point in time than the recorded data.

* * * * *

UNITED STATES PATENT AND TRADEMARK OFFICE
CERTIFICATE OF CORRECTION

Page 1 of 1

PATENT NO. : 12,462,508 B1
APPLICATION NO. : 18/103583
DATED : November 4, 2025
INVENTOR(S) : Deliz Centeno et al.

It is certified that error appears in the above-identified patent and that said Letters Patent is hereby corrected as shown below:

On the Title Page

ABSTRACT, Item (57), Line 3, reads:
"...content creator) that is based recorded ..."
Should read:
--...content creator) that is based on recorded ...--

Signed and Sealed this
Second Day of December, 2025

John A. Squires
*Director of the United States Patent and Trademark Office*